United States Patent [19]
Del Rio

[11] Patent Number: 5,889,375
[45] Date of Patent: Mar. 30, 1999

[54] TORQUE LIMITING SERVOMECHANISM

[75] Inventor: Salvador Sastre Del Rio, Madrid, Spain

[73] Assignee: Centralair, S.A., San Sebastian, Spain

[21] Appl. No.: 569,228

[22] PCT Filed: May 5, 1995

[86] PCT No.: PCT/ES95/00051

§ 371 Date: Apr. 8, 1997

§ 102(e) Date: Apr. 8, 1997

[87] PCT Pub. No.: WO95/30852

PCT Pub. Date: Nov. 16, 1995

[30] Foreign Application Priority Data

May 6, 1994 [ES] Spain ..................................... 9400966

[51] Int. Cl.[6] ..................................................... H02P 7/00
[52] U.S. Cl. ........................................... 318/432; 318/611
[58] Field of Search .................................... 318/432, 434, 318/611, 612, 623, 624; 310/51, 94, 95, 99, 329, 330, 328; 251/267–280, 284–288

[56] References Cited

U.S. PATENT DOCUMENTS

| | | | |
|---|---|---|---|
| 5,432,422 | 7/1995 | Nagano et al. | 318/611 |
| 5,726,520 | 3/1998 | Grahm | 310/328 |
| 5,791,433 | 8/1998 | Murakami et al. | 251/267 |

Primary Examiner—Jonathan Wysocki
Attorney, Agent, or Firm—Klauber & Jackson

[57] ABSTRACT

It comprises a mechanical power input (1, 55) receiving the power preferably from an electric motor and a mechanical power output (3, 67), as well as transfer means (2, 2', 2", 2"', 4, 64) for transferring this power from the input to the output, and control means (2, 5, 6, 7, 59, 60, 61) for controlling the transfer means (2, 4, 64) to make sure that the power transferred at the output does not exceed a predetermined level. There are provided means to break down the power received at the input into a power applied at the output (3, 67) and excess power which is used to produce the cut-off of power supplied by the motor. This excess power is controlled by the pressure of element (6, 7, 61) whose tension is adjustable which actuates against a movable surface which defines a cam profile, thereby increasing the force or torque during the angular or linear motion of the cam (2, 2', 2", 2"'). The transfer mechanism includes a basic group with four different output alternatives (C1, C2, C3 and C4).

28 Claims, 20 Drawing Sheets a.1 a.1

B-B

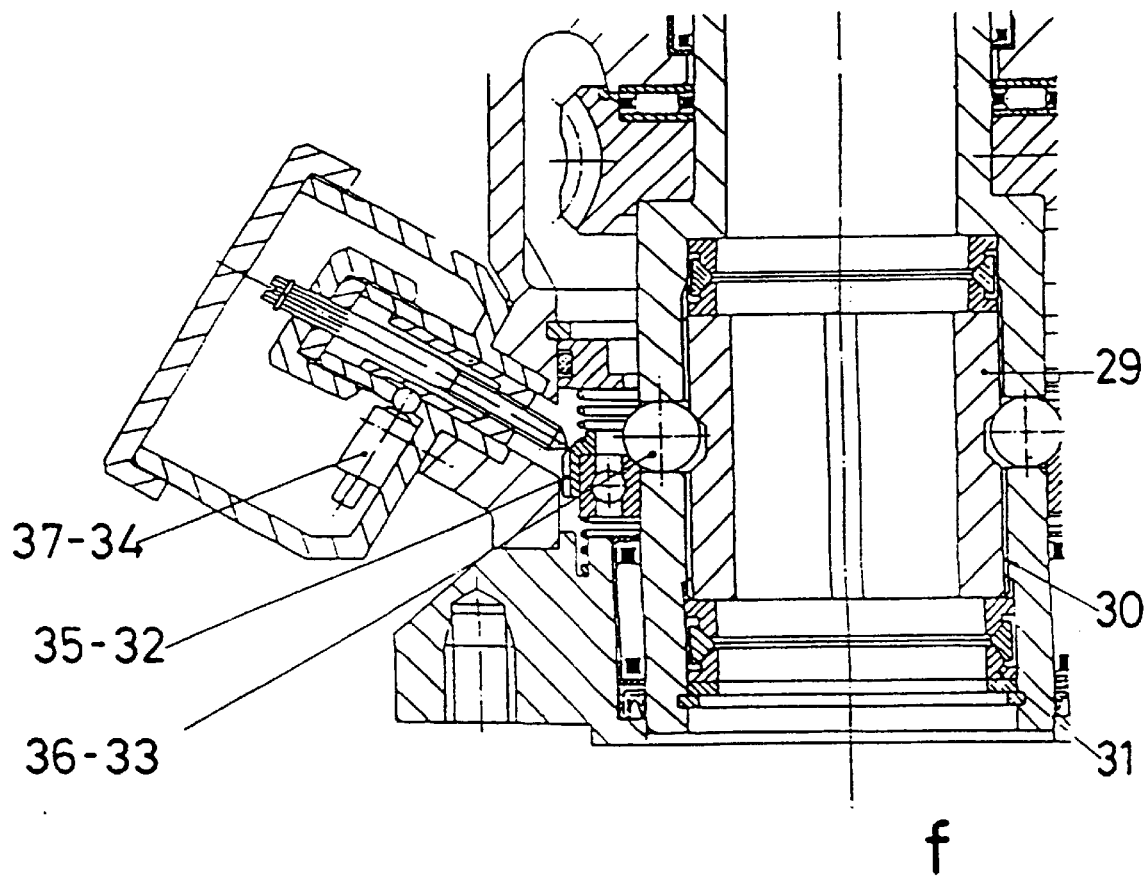
FIG. 3.1

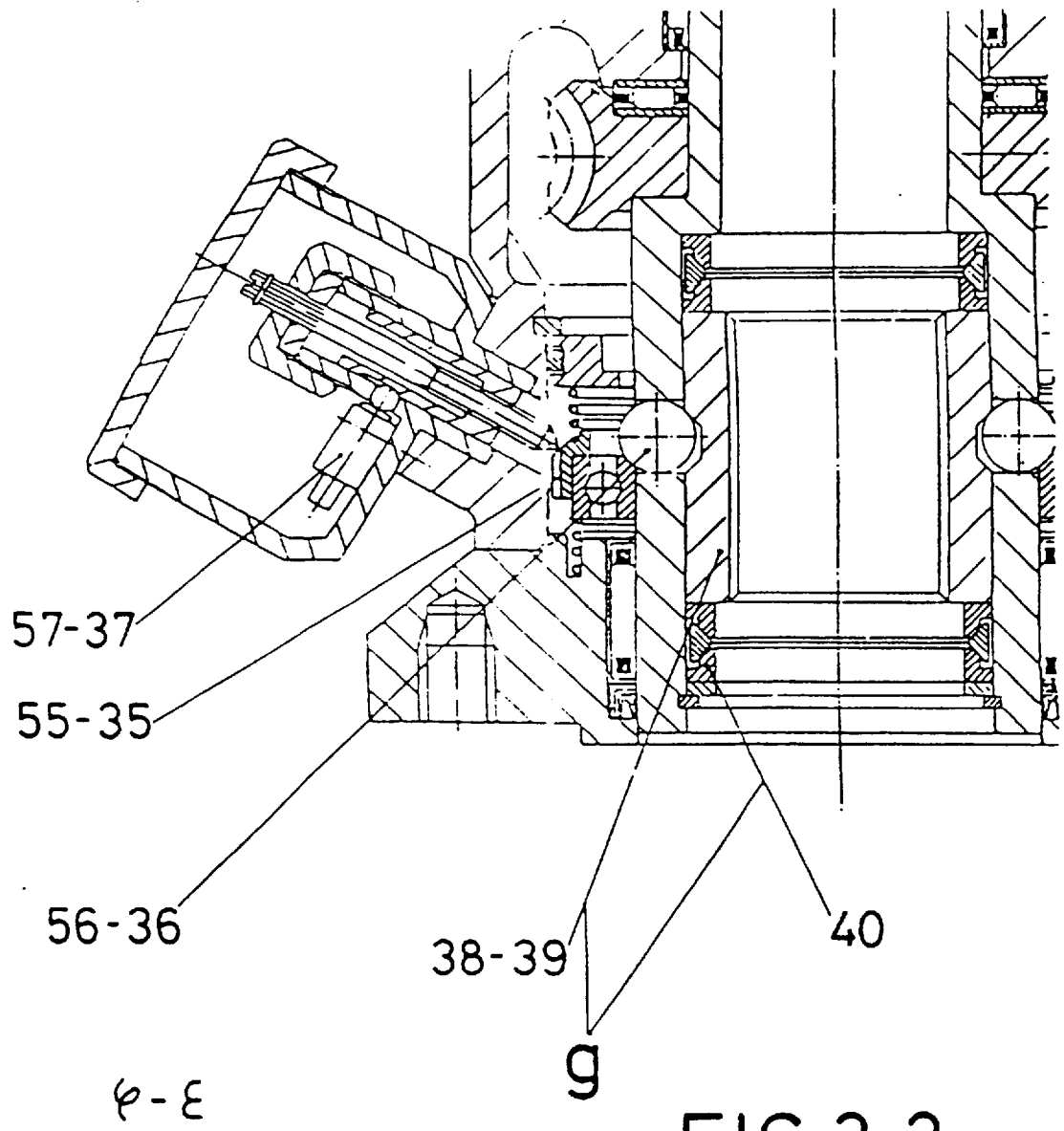
FIG. 3.2

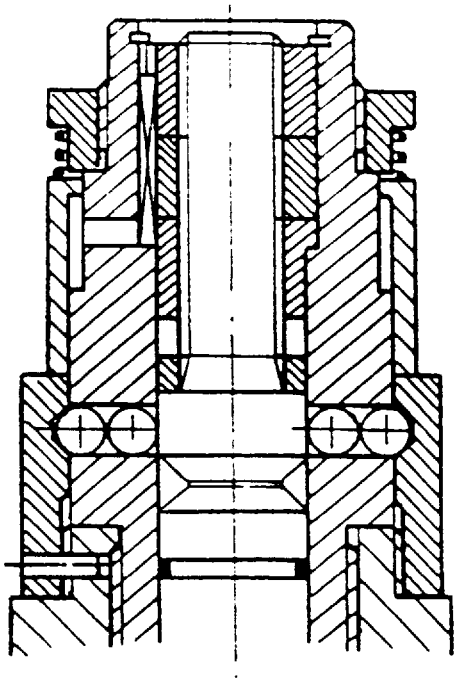
FIG.3.3a
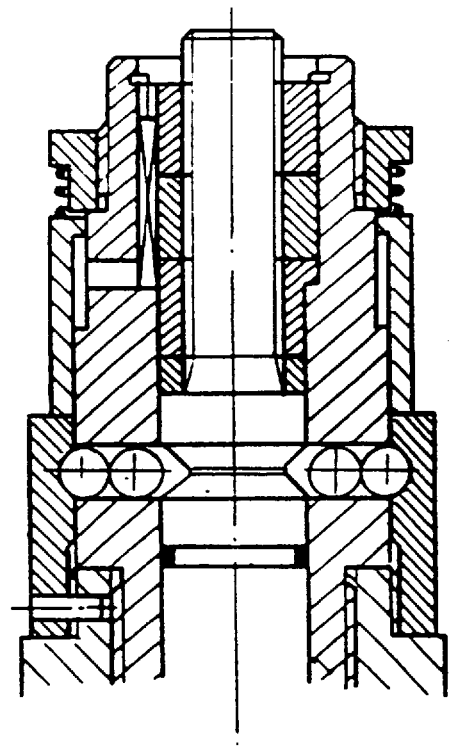
FIG.3.3b
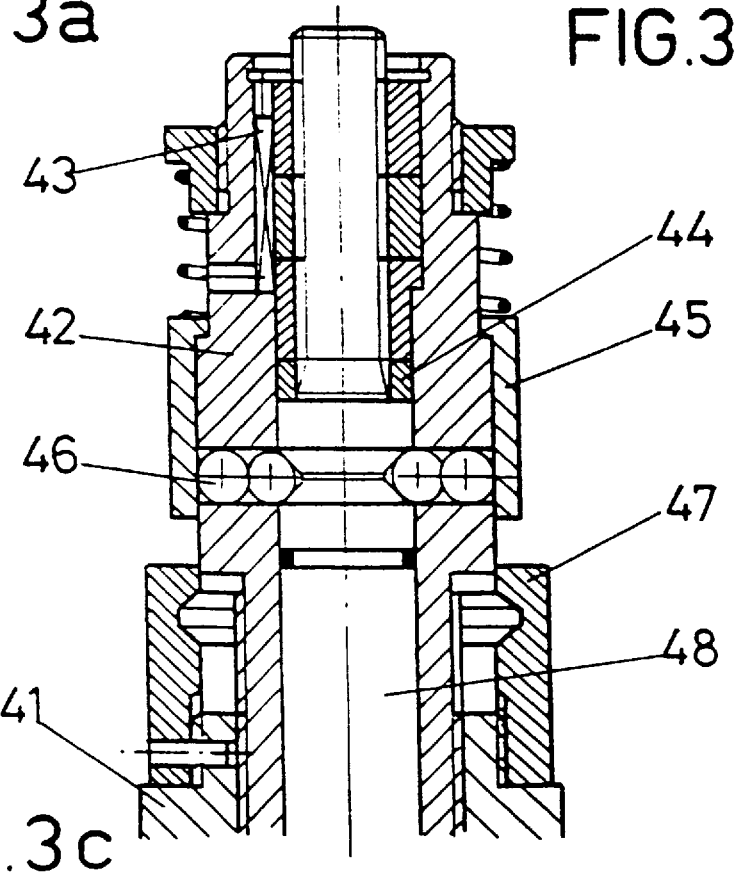
FIG.3.3c

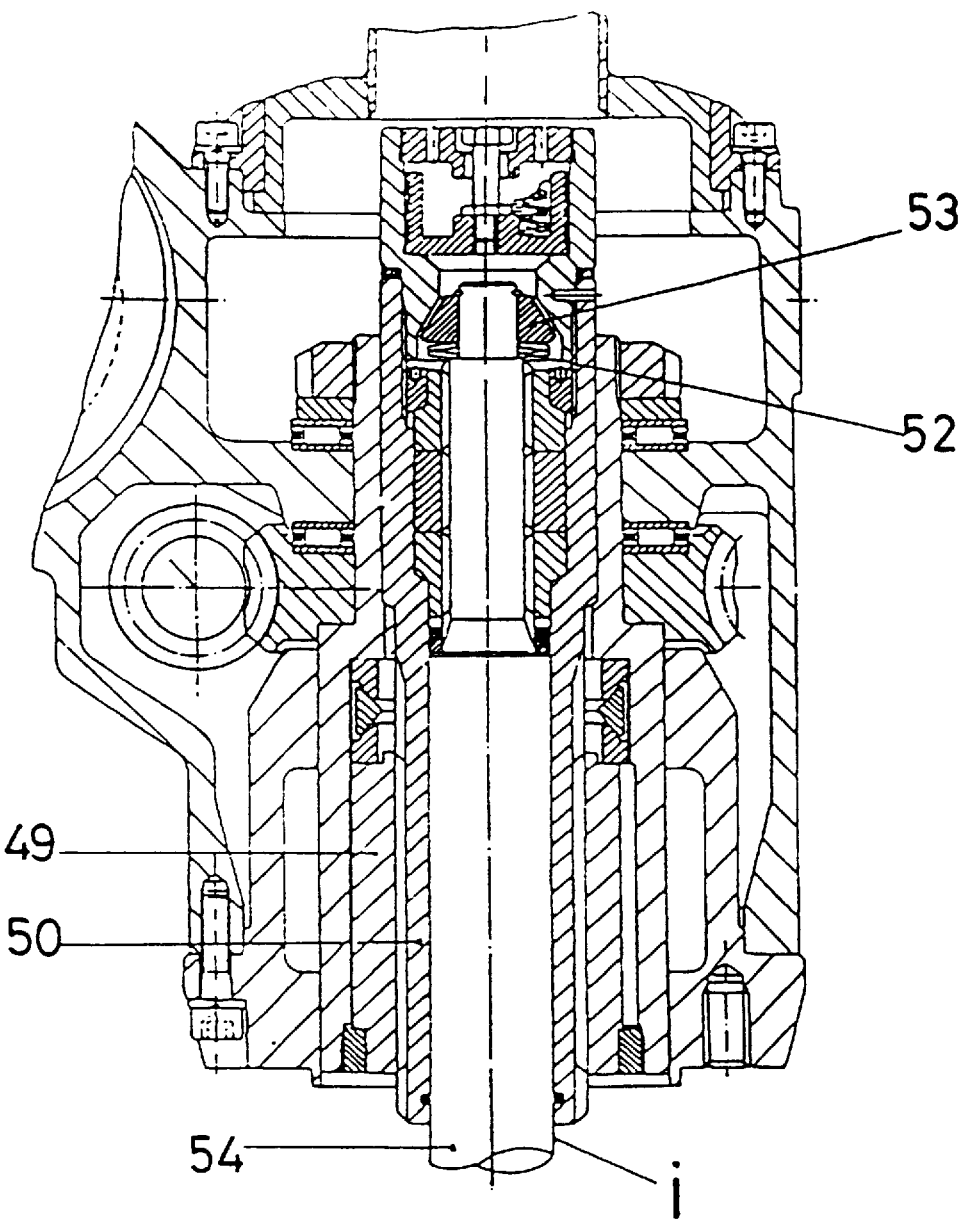
FIG. 3.4 a.2 a.2

V-V a.3 a.3
B-B

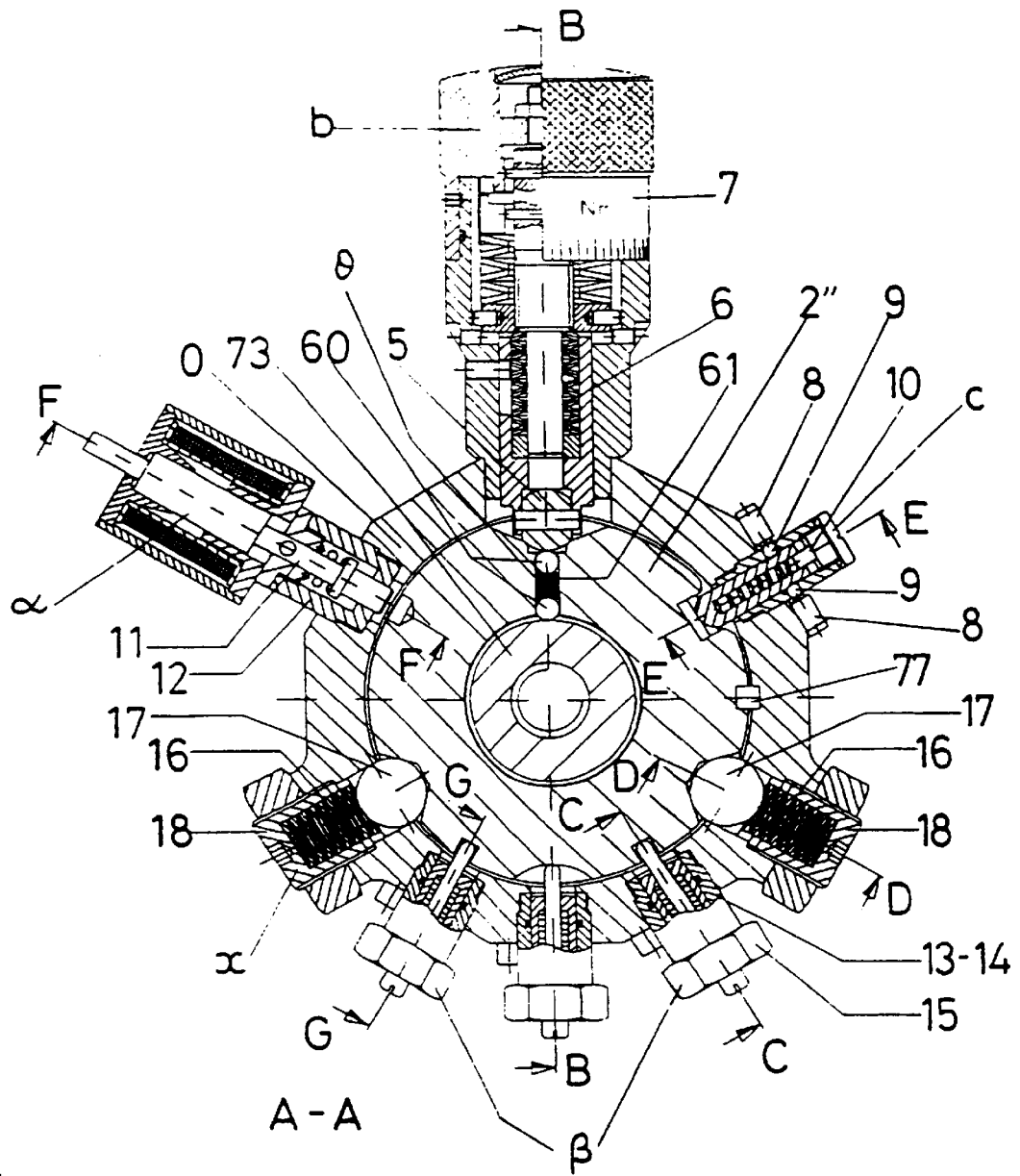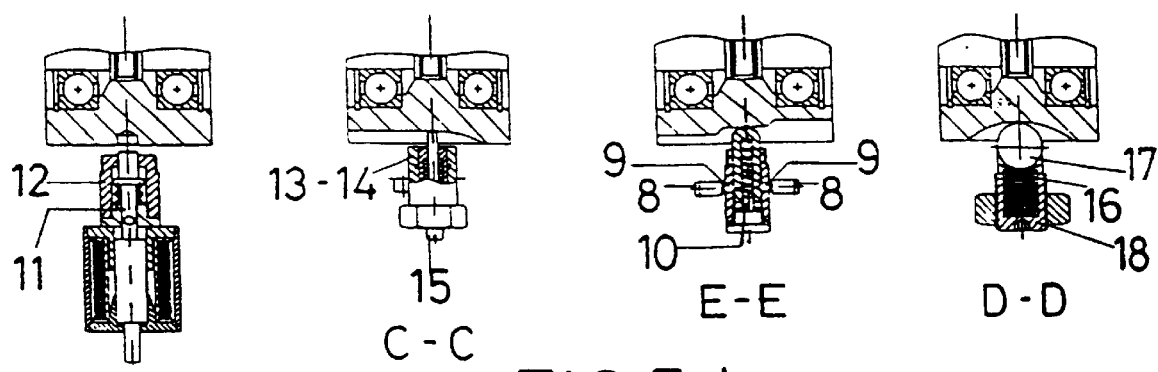
FIG.5d

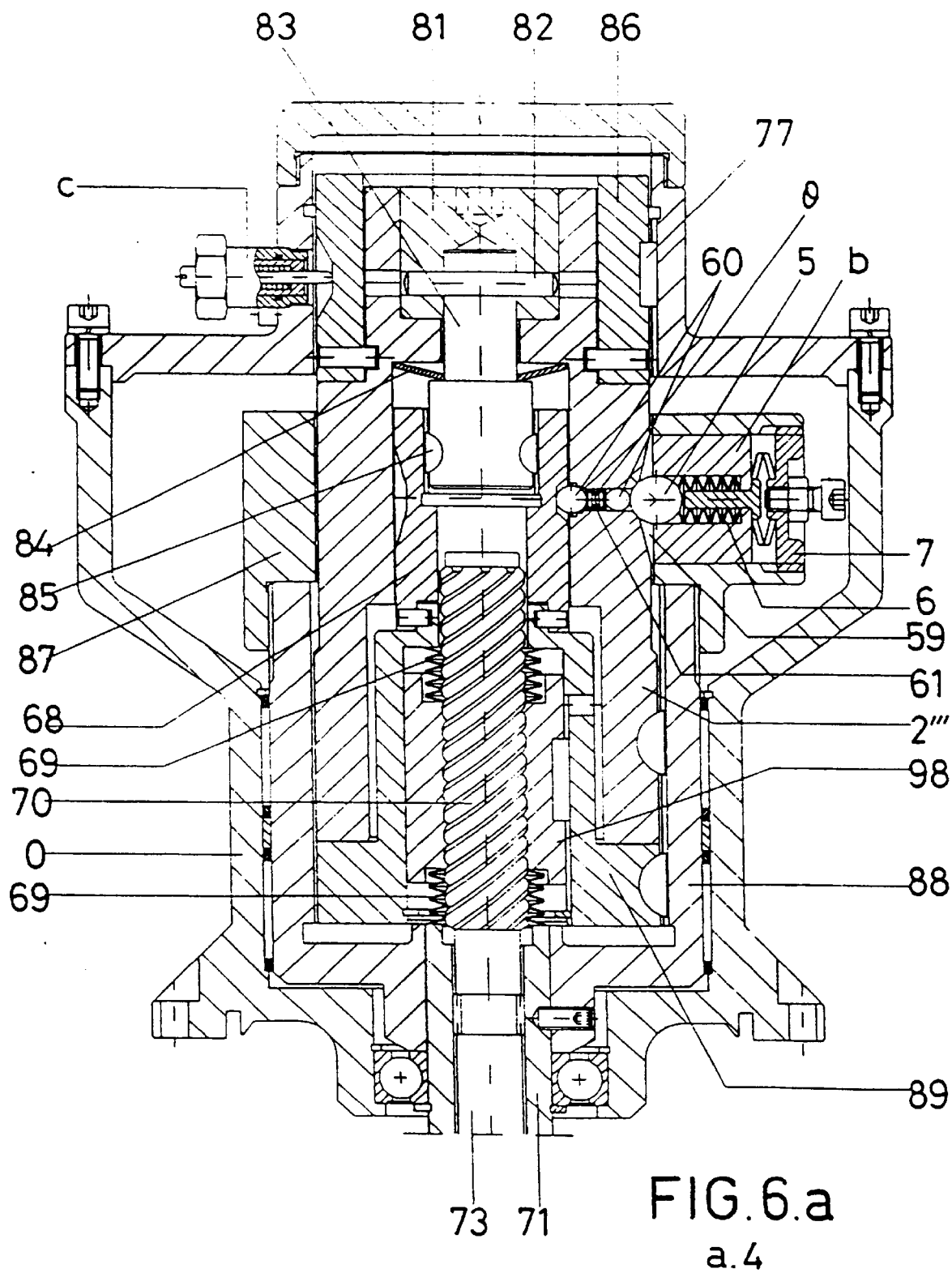
FIG.6.a
a.4

X-X a.3

TORQUE LIMITING SERVOMECHANISM

OBJECT OF THE INVENTION

As expressed in the title of this specification, the present invenion refers to a mechanical-kinetic instant retaining and limiting servomechanism of the torque transmitted from a shaft or input mechanism to an output, which, applied to operations of valves or other uses, makes it possible to control the problems of electronic or electronic signal delay and of accumulated inertia, even managaing to take advantage of them for other uses.

This invention is mainly developed directed towards bypass and fluid shutoff valves, where the variety of the same and circumstances of the process require certain characteristics. However, this does not mean that we limit the possible scope of application to sdaid field, but rather said invention or any dervivation of the same can be applied to any other technical field in which a limitation of torque transmitted with certain characteristics (explained hereinafter) is required.

Said servomechanism has a series of relevant and advantageous features with regard to other mechanism used at this time for the same purpose, and it has the following particularities:

a) The conversion of manual power (by means of a handwheel, lever, etc.) or electric, pneumatic, hydraulic (by means of cylinders, turbines or motors depending on the case) into mechanical power by adjusting and/or limiting the latter in a very precise manner.

This precision allows, whatever the speed is, not to exceed the specific pressure of the seat in seated valves and gate valves and, additionally, in the latter, not to creaqte any variablility in the shutoff valves.

B) The use of a gear planetary mechanism wherein the movement in which it enters through one of the center cams while the other one is braked, it comes out through the planetary member holder arm, or when the planetary member holder is braked it comes out through ones of the cams controlling the excess power.

Upon reaching a predetermined torque, the planetary member holder wheels stop or vice versa and the braked wheel is released, causing the applied power to be put off.

A shaft provided with thread or the like may be used. The shaft moves axially and acts on a truncated-cone shaped portion of the cam that causes the cutoff of the energy when a predetermined torque is exceeded.

As of then, it is possible that the power of the motor, as well as the associated kinetic and elastic energies, do not have any effect on the element on which said energies have been applied up to then.

This initially predetermined torque attained is the sum of a mechanical torque supplied by the motor, by the available kinetic torque due to the inertia of the motor itself and of the masses in movement, which makes it possible to apply much smaller motors; even to add additional inertia masses so as to increase said available kinetic energy.

C) The use of an auxiliary flywheel or lever, in the case of an emergency or for sporadic needs, in such a way that the normal energy supply has preference over the manual supply and with the particularity that the engaging and disengaging lever is not necessary, which not only avoids accidents due to lacks of synchronism, but rather it reduces critical emergency circumstances, idle times for preparing the operation.

D) The centrifugal clutch which, aside from having connected the flywheel in a state of rest of the motor, when the latter is connected the flywheel disconnects and goes to a dead point. The motor is connected with the input shaft of the planetary element of the mechanism almost at a rated speed.

D) Taking advantage of the centifugal clutch or similar centrifugal mechanism to achieve self-regulation of the locking of the torque limiting and regulating group. Thus it is achieved that in terms of the speed more or less torque is given in order to achieve the instant release of the circumstantially movable part.

E) Using a high yield irreversibility mechanism in those cases in which said irreversibility is not ensured in the rest of the actuator-valve mechanism, or in those cases in which it is desired to have ensured irreversibility.

This irreversibility mechanism makes it possible to keep a general high yield upon allowing the reversibility of other elements of the actuator-valve unit.

F) Using the mechanical control locking, either manual, or else automatic mechanical or elecgric, electronic, magnetic, pneumatic, hydraulic, or in combination of the first of them with each one of the remaining ones, to bridge the mechanical torque limiters.

The function of manual locking, in emergencies, is that of using the maximum available torque once or twice, to accumulate through the irreversibility mechanism as much as said maximum torque as required. The task of mechanical automatic control locking is that of bridging the mechanical torque limiter so that selectively, the available maximum torque can be used during the pre-established period or periods.

G) In the event that the flywheel, clutch and locking are going to be mounted simultaneously in the servomechanism, that it is possible to obtain powers higher than those produced by the maximum torque of the motor, without the need of successive starting, due to use of the centrifugal clutch.

In effect, upon reaching the maximum torque and reducing the number of revolutions, the motor is disengaged and without it managing to stop, although it is already rotating off-circuit, it recovers the speed until it id engaged again, providing again kinetic energy aside from the maximum mechanical torque.

This operation can be repeated as many times as required, being limited by the heating of the motor.

H) The general checking of torques, in all of the intermediate elements, by means of the circumstantially movable part and upon that one being released, obtaining data by direct mechanical, electric, electronic measuring, or else by means of a microprocessor, a computer and a printer.

I) The specific and very precise checkings of stresses on the outlet rod of the mechanism, for direction actuation of the valve or other actuated element, by including in the mechanism a charging cell for direct mechanical, electric, electronic, measuring etc., or by indirect measuring and graphing by means of a micrprocessor, a computer and a printer.

J) Converting circular movements into rectilinear movements by coupling the outlet nut of the mechanism in an intermediate spindle with double thread (male and female, one inside and the other outside), until the integral stop of both, wherein the thread of this spindle acts as a helicoidal cottwerway of the spindle of the valve or other actuated element, threaded with a smaller diameter and pitch than the thread of the nut, whereby upon reducing the speed of movement with the same output torque, a stress four or five times greater is achieved, in other words, multiplying power is achieved.

K) Automatic retightening of the packing, in all the equipment or appratus where it is so required, by means of including two elastic elements between which is installed, in a floating manner, the output nut of the mechanism (charging cell), which turning in one direction or the other depending on the direction of movement of the spindle, the nut moving proportionally to the spindle, the nut moving proportionally to the force produced by the pressure of the packing. With the progressive wear of the packing there is a reduction of the passive force and with this, a signal to the electric clutch or to another second actuator mechanism, the latter being responsible for automatic retightening of the packing, the grip torque having the possibility of being limited and adjusted, as we will see later on.

L) Upon not affecting the integrity of the actuator mechanism as well as the of the element actuated by the latter, additional breakage of the microswitch of the torque limiting mechanism and therefore, there is no need of any additional path limiting switch.

This is due to the particularity mentioned above in point B) upon mechanically disconnecting (without any electric, electronic, magnetic dependency, etc.) the application of power of the motor and the associated kinetic energy, to the element to which such energies are applied. These excess energies are absorbed as work by torques equal to or smaller than the maximum cutoff torque, and they can be used for other purposes, (signalling, self-checking, etc.)

Thus, in the event that the microswitch of the toruqe limiting mechanism breaks, the motor will continue to work, with the associated kinetic energies thereof, but without managing at any moment to transmit them to the final or output element.

It will be this way until the thermal switches of the motors disconnect it due to overheating.

Given that the latter would greatly shorten the life of the actuator or mechanism to transfer mechanical power, it is why a torque limiting mechanism microswitch is used. Its purpose is only to protect the motor against heating up and thus reduces times between consecutive operations; but without thus protecting the integrity of the entire actuating mechanism. The valve or actuated element already remains assured by said damping and control of the above mentioned excess (motor power and kinetic energy).

As it is inferred from the above, the mechanism of the proposed invention is useful in industry in general and particularly in the operation of flow control valves and fluid shutoff valves, robotics, machine-tools, conveyor belts and pushing cylinders, among others. These operations can be done directly or else by reducers, couplinjgs, nuts, transmissioins and other known devices.

M) Having a regulated maximum torque that is self-adjustable in terms of the speed that said mechanism requires.

As it will be seen in the description of the invention, several embodiments are possible to obtain a servomechanism that has such characteristics.

BACKGROUND OF THE INVENTION

The actuators or actuation mechanisms to transfer mechanical power from one input to an output, existing on the market, generally include a floating endless system, resting on its ends by elastic elements and a crown that, upon turning, when it comes up against an obstacle or reaches the end of its run, the worm moves cutting off the current from the motor. The actuation mechanisms have a series of inconveniences that will be stated hereinafter, determined by the basic concept of embodiment that they apply and which have been tried to be solved in very different ways, though without attacking said basic concept of embodiment.

As it is specified in Siemens's German patent PCT/DE91/00600, upon sizing an action regulator (actuator) for valves it is necessary to take into account certain factors. On the one hand, due to defects, aging or defective maintenance (such as corrosion of the spindle, wear or excess tightening of the packing etc.) the turning torque needed to close the valve may increase considerably (for example from 30 to 80 Nm.) On the other hand, upon sizing the action regulator (actuator) said value (80 Nm) must be taken into account in unfavorable operating conditions of the actuator itself (a voltage drop in the line, tolerances, temperature of the motor, etc.) In this way the actuator in oppositely unfavorable conditions, there may be a supply of 10 times more theoretical turning torque than that which is needed (30 to 300 Nm), in the event that the dependent torque disconnection were to fail. This may seriously affect the actuated mechanism (valve, in this case), even managing to make it unserviceable.

The solution provided by this German patent is that of a breaking frame of the spindle of the valve that acts from a given maximum torque, preventing this to reach the extreme of 300 Nm in the event of failure of the control switches. With this solution the effect is reduced but the problem that causes said effect is not solved.

In order to try to overcome this effect (aside from others), actuator manufacturers include an additional microswitch, of an (intentionally) synchronized path (path limiter) with the torque limiter. Said synchronization disappears as soon as there are minimal temperature variations, once again posing the problem of destroying the valve.

In the event that there is no failure in the control s witches, these actuators have two inconveniences that can lead, at average and high output speeds (100 to 300 nm/min., according to the type of valve), to reach excess output torque values much higher than the values pre-set by said control switches. This excess output torque likewise manages to cause significant damage to the actuated valve.

As is stated in "Bulleltin FC-77 of Limitorque Corp.", said inconveniences are:

1) It does not the release of inertia from the mechanism. In this way excess pressure in the seat of the valve and excess stresses on the rod are created. These anomalies are increased up to significant values when the output speed of the actuator increases. This all makes it necessary to limit the output speeds of actuators. For example in all-or-nothing (closed loop) valves the speeds of the rod are limited to 300 mm/min for gate values and to 100 mm/min for seated valves, running the risk of damaging the valve, despite said limitations. At times, it is even essential to equip the actuator with a second high speed motor, so that in the cases of a serious emergency, the output speed increases considerably, even knowingly that this will lead to the destruction of the seat and greater damage to the value.

In adjustment and shutoff valves, the need of very powerful motors for the shutting itself, involves an increase of the inertia, which requires a reduction of the speed to maintain the precision of the adjustment, sacrificing the response speed, even in some cases, requiring the need of two valves, an adjustment valve and a shutoff valve, for said tasks.

2) These proceblems of excess pressures are increased upon additionally considering the electric signal delay between 20 and 50 mn; that exists between the signal of the switch of the torque limiter and the energization of the of the motor operating and stopping contactors. Besides this anomaly is inevitable and does not depend on the output speed of ther actuator but rather on the electric system used. Its effect simply (increase of torque above the adjusted one) is significant at average and high actuator output speeds (100 to 300 mm/min.).

These two anomalies are produced upon the motor and the other elements of the actuator being permanently mechanically linked up to the output, either by endless-crown embodiment or else in other embodiments used less but also with the same principles. Within all of them the main problem is that of collecting the excess power from the instant from the jump of the torque limitation and to dissipate it in a sure manner and without effecting the limited torque.

Within these embodiments is Bernard's French patent FR 2699983-A1 that uses a planetary reducing mechanism to limit, in its outside crown and by means of adjustable springs, the transmitted torque.

Despite the novelty of this actioning against the "classic" endless-crown, it does not solve its problems. The inertias accumulated at high speeds are still not released and the signal delay times keep affecting it in the same way.

In the moment that the torque control switch is actuated, previously adjusted to a maximum necessary torque, the signaly delay and the inertia (if they are important) make the regulating springs continue to tighten accumalatively and thus a torque greater than the adjusted one to the output shaft of the actuator is transmitted.

Practically the same solutions, when limiting the transmitted torque, are applied by German patent DE-A-3010019.

U.S. Pat. No. 3,921,264 also deals with a mechanism formed by two planetary reducers. In one of them the outside crown remains fixed by means of a solenoid that comparably energizes the motor. When the motor disconnects, the currect stops reaching said solenoid and, therefore, it totally releases the crown or cam of the planetary element. In this way no torque is transmitted by means of the planetary reducer as of this moment.

This embodiment does not solve the problem of electric delay but rather it even makes it worse by using an electrically excited solenoid. Once this delay has taken place if the torque transmission is totally disconnected, the problem of accumulated inertia is avoided. At any rate this would only serve to "absorb" accumulated inertia of the limitating value since, on the contrary, the outside crown would be kept turning with too much accumulated kinetic energy and the electric signal delay would be even greater than the normal one with the problems that this involves.

Another inconveniences and anomalies, other than the above cited ones, that, said actuators generally have are:

3) Needing an additional manual engaging-disengaging lever to carry out the same functions. In this group Japanese patent JL-60 018 679 that needs a lever that turns its coupling-decoupling elements would be included.

4) The operator needs to use both hands together, having to feel out the above cited lever with one hand, while turning the flywheel with the other hand trying to fit the spaces of the same with the teeth of the intermediate wheel, after having deblocked the motor.

After having fit the teeth in the spaces, it is then possible to operate the flywheel.

The flywheel is likewise used to tune up the path limiter of the actuator mechanism with which the mechanical power is transferred from an input to an output.

This path limitation needs great precision since in the event that the microswitch of the torque limiting mechanism theoretically becomes unservicable, the microswitch of the path limiting mechanism is the one responsible for disconnecting the motor to prevent the deterioration of the valve and/or of the actuator mechanism itself.

5) There is no mechanical manual nor automatic blocking. In the event that this were installed, in conventional actuators, it could not be used because of the permanent mechanical link, already described above, between the motor and the remaining components of the actuator.

6) Stresses higher than those produced by the maximum torque cannot be obtained, without stopping the motor, as there is no centrifugal clutch or multiplier.

7) There is no irreversibility mechanism. This irreversibility, in most motorized valves is ensured by the rod and/or nut of the valve (or of the actuator mechanism) that tends to be irreversible and with a low mechanical efficiency.

This limits the overall efficiency of the unit and prevents use of more efficient rods and nuts (longer pitches and ball spindles) that, by definition would be reversible.

8) The need of costly preparation times of the valve and of the actuator mechanism to be able to make timely checks of the stresses in the spindle.

9) Likewise, these costly preparation times are needed to be able to check inside the actuator.

10) The need to sacrifice the high speed to obtain great toroques at the output of the actuator, or else, the need to use a two speed motor or one with an electric brake.

11) The sporadic and cyclic presence of an operator to retighten the packing, by hand and to control these tightening pressures; being able to destroy the packing by exceeding its limit tightening pressure, being able to even ,at times, brake the movement of the spindle, increasing in these cases the passive stresses that would regulate the correct operation of the actuator-valve unit preventing the correct closing of the valve and thus its wear and tear.

12) Having a regulated maximum torque that is independent of the turning speed of the mechanism.

DESCRIPTION OF THE INVENTION

In broad outline, the mechanical-kinetic servomechanism of instant limiting and retaining of the toruqe transmitted by a shaft or input mechanism to an output one, that comprises the object of the present invention consists of the following:

Mechanical power and its corresponding kinetic energy is received from a motor or input shaft, transferring one part of the energy received to an noutput and there being some control means so that the power transferred to the output does not exceed a certain level.

According to the invention, the power received at the input is broken down into: energy applied to an output to actuate equipment such as a valve or other device and excess power that is used to achieve a relative movement between a contact element and a surface with a suitable geometric profile of a circumstantially movable part.

The contact element transmits a pressure assisted by a torque limiting group /and regulator and the movement of the outside configuration of the circumstantially movable part (angular, axial or compound depending on the constitution thereof) determines a more or less progressive increase of the pressure depending on the form adopted for siad configuration braking the exesss power, nce there has been a cutoff of the power of the motor as a result of this movement beginning. Said power cutoff at the input of the output of the mechanism is instant and sudden.

This mechanism can be considered comprised of three parts or modules.

The first and most important part is the input of the mechanism.

The second one is between the first one and the motor and has a centrifugal clutch and manual control though some solution may not have to be given to this part.

Finally, the third part corresponds to the output of the mechanism and connection with the actuated element, it being able to have four different variants.

These three considered parts have independent functionality of their own and and can comprise perfectly differentiated modules, while when they are presented grouped together, for reaons of manufacturing and practical use basically, they comprise a single module.

To the same independent or grouped parts one can add a series of additional devices, in multiple combinations that will be described later onbe, which laso have in turn the particularity of being able to comprise independent modules.

Although hereinafter and in connection with the attached figures one will be clearly able to see the structure of the three component parts and their additional corresponding devices, both are diagrammed hereinafter, with the respective breaking down into groups and the descriptions of the main parts comprising the latter, all of them identified with letters and numbers (diagram 1).

The numbers and letters here correspond with thpose pf the figures shown in the examples of the preferred embodiment to provide a better understanding of the diagram and figures that are selected as an example and for a better understanding of the description though they must not be considered as restrictive but rather the interpretation thereof must be considered in the broadest sense.

basic groups and additional devices, such as to form a manual as well as motorized actuator mechanism, as well as for the individual application thereof or combined use without other types of actuators already known, giving them therefore an integrating nature, considering all the possibilities in the broadest and never restrictive manner.

As to the irreversibility mechanism, we can say that it defines a irreversibility mechanism that can be placed in different positions within the combined transfer mechanism. Thus, it can be included in the input module, or between said module and the intermediate module, or between the intermediate module and the output module or inside the output module.

Said irreversibility module is used to retain the circumstantial or final stopping, as well as the transmitted stress.

Said irreversibility mechanism, combined with the centrifugal clutch also makes it possible to obtain higher stresses due to successive accumulations of kinetic energy in the motor; this curve being higher than the one produced by the maximum torque.

In the input module there are different solutions when it is necessary to limit the transmission of the torque from the shaft or input mechanism to the output one.

All of them are based on a circumstantially movable part that is normally braked by a fixed or movable torque limiting and regulating group.

This torque limiting and regulating element is formed by some elastic elements that apply their pressure against the outside configuration of said circumstantially movable part by means of one or several contact elements, in such a way that upon exceeding apre-set torque said circumstantially movable part is released, beginning its relative movement and due to its configuration, upon causing the instant cutoff of input power by means of a device included for said purpose.

The different solutions for said input module vary in the shape that the circumstantially movable part takes on and on the relative movement that the part acquires upon being released. Maintaining the sameinstant breakdown concept of

DIAGRAM 1

| MODULES § | INPUT MODULE A | | | INTERMEDIATE MODULE B | | OUTPUT MODULE TURNING C1 | THREADED OUTPUT MOD. C2 | MULTIPLIER MODULE C3 | MULTIPLIER MODULE II C4 |
|---|---|---|---|---|---|---|---|---|---|
| VARIANTS | (a.1) | (b) | (c) | (d) | (e) | (f) | (g) | (h) | (i) |
| BASIC GROUPS | Planetary group (a.2) Conical plan. (a.3) Linear Group I (a.4) Linear Group II | Torque limiting group | Energy cutoff group | Clutch or Centrif. Group | Manual Control Group | Bushing group | Group with floating nut | Multiplier Group I | Multiplier Group II |
| | ($\alpha$) | ($\beta$) | ($\chi$) | (w) | ($\delta$) | ($\epsilon$) | ($\phi$) | ($\epsilon$) | ($\theta$) |
| ADDITIONAL DEVICE | Mechanical locking | Checking mechanism | Auxiliary damping | Irreversibility module | Maximum torque checking | Packing retightening signal | Rod stress checking | Packing retightening signal | Locking adjustment |

Due to the integrating nature of this this mechanism proposed by the invention, it is possible to use it individually or all the logical possible combinations between modules, the transmitted torque, releasing or taking advantage of the excess energy, upon said circumstantially movable part being released by said torque limiting group.

In the first solution, the circumstantially movable part is the cam of a gear planetary mechanism whose planetary members gear in the inside part of said cam. The cam is normally braked by said torque limiting and regulating group.

In the second solution said circumstantially movable part is the planetary element holder of a gear planetary mechanism, dragged by said planetary members and remaining normally braked by said torque limiting and regulating group.

In these two solutions the movement that said cirkcumstantially movable part acquires is a turn with regard to its own shaft and the torque limiting and regulating element applies its stress against the outside configuration of both parts.

In a third solution the circumstantially movable part is a part with a predetermined shape that can only acquire longitudinal movement through its shaft, never turning movement, being normally braked by said torque limiting and regulating group.

In the last of the solutions presented, the circumstantially movable part is provided with a predetermined shape, similar to that of the previous solution. In this case its movement is normally turning movement, with longitudinal displacement when said part is released by the torque limiting and regulating group, that only prevents said longitudinal movement and not the turning movement, given that this element turns integrally with said part.

With said particularity of the torque limiting and regulating group turning integrally with the circumstantially movable part, there is self-adjustment of said torque limiting and regulating group, upon varying the stress that the latter exerts on the circumstantially movable part in terms of the turning speed of both (in starting up, shutting off, clogging, etc.).

A series of auxiliary or secondary devices that are actuvated upon said circumstantially movable part moving upon being released by the torque limiting and regulating group, have been provided for, depending on whether said movement is turning or not (current cutoff device, damping, measuring devices, etc.)

A device that allows circumstantial locking of the movable part, avoiding its relative movement, has also been provided for.

In the cases in which there is turning movement applied there is also an increase of the kinetic energy by means of including an inertia flywheel.

It is also possible to include a locking adjustment mechanism that makes it possible to vary (and therefore adjust) the stress that the torque limiting and regulating group exerts on said circumstantially movable part in terms of a series of parameters. Hence, for example, it is achieved that when starting up there is a higher regulated torque than in other moments.

Including an automatic centrifugal clutch connected to the motor, disengaging the energy flywheel and simultaneously carrying out the connection woth the motor upon reaching the rated revolutions has been provided for.

The irreversible element transmits the torque of the input shaft to the output shaft and during this transmission any movement of the output shaft is blocked in the contrary direction of rotation.

It also foresees the inclusion of a group with a bushing that permits a checking of the output torque capturing of a signal by means of two concentric bushings with reversible thread, acting likewise as a helocoidal cotterway. The inside bushing rests on the elastic elements that allow it to move this movement being used to generate a signal that indicates the variation of the passive forces. An increase of this force corresponds to this shorter run, that indicated an anomaly in the actuator mechanism or in the actuated equipmment, while a longer run corresponds to a reduction of the passive force. In the actuated equipment that has packing, this signal is taken advantage of to order retightening by means of an electroclutch or auxiliary actuator mechanism.

Instead of the group with bushing one can add a floating nut group that allows checking of the thrust of the pressure exerted longitudinally by the spindle on the nut that commands it, the nut being floating in one or both ends, upon one or two elastic elements that allow it to move.

Also by means of a multiplier group it is possible to achieve that, with the same output torque and revolutions of the actuator or reducer, one can convert circular movement of the main nut into linear movement, by means of a doubly thread sleeve, the male in the main nut and the female in the end of the spindle, this being able to move but not turn. In this way, the threads can function alternatively as such, or else, as helicoidal cotterways depending on a rigid or flexible linking element, as well as some stops, resulting in greater speed and less stress in the linear movement of the spindle when the smaller thread acts as a helicoidal cotterway and the smaller one as a thread and a smaller speed and greater force when both function reciprocally. Upon reversing the turning of the main nut the spindle is removed from the spindle by means of the smaller thread, and upon this thread stopping the speed spindle increases in its movement through the larger thread, until reaching its prefixed position remaining displaced to repeat the cycle completely or partially.

To provide a better understanding of the features of the invention and forming an integral part of this specification, a series of drwaings in whose figures the object of the invention has been represented in an illustrative and non-restrictive manner are attached hereto.

BRIEF DESCRIPTION OF THE DRAWINGS

FIG. 1b is a cross-section view of that which is shown in FIG. 1a.

FIG. 2b is a section along the B—B cut line of FIG. 2a.

FIG. 3.1. is a partial longitudinal view of the rotating output module (C1).

FIG. 3.2 is a sectined view similar to that of FIG. 3.1 of the threaded output module (C2).

FIG. 3.3a is a longitudinal and corss-section partial view of the putput module with the multiplier I (h), one being able to see how the greater thrust effect has been produced and the mechanism is ready to start the backward movement.

FIG. 3.3.b. is a view similar to that of FIG. 3.3a in which one can see how the thread with a smaller diameter becomes a helicoidal cotterway.

FIG. 3.3.c. is a view similar to FIGS. 3.3a and 3.3b wherein one can see the instant in which the thread of the main nut becomes a helicoidal cotterway, while the thread of the small nut is no longer a cotterway and in its turning it moves the spindle longitudinally.

FIG. 3.4. is a sectioned view of the output module with a multiplier (II)-(C4).

FIG. 4.b. is a sectioned view of the whole mechanism, adopting said input module (a.2.).

FIG. 4.c. is a section along V—V line of FIG. 4b.

FIG. 5.b. is a sectioned view of the mechanism unit, adopting input module (a.3.), multiplier 1 (h), irreversibility module (w), checking of the rod force (β) and packing retightening signal (ε).

FIG. 5.c. is a cross-sectin view of the input module (a.3.), taking a shaft (71) as an input element instead of the motor (100).

FIG. 5.d. is a section along the A—A cut line of FIGS. 5a and 5c.

FIG. 6.b. is a sectioned view of the mechanism,adopting said input module (a.4.), the irreversibility module (w) and the motor (100).

FIG. 6.c. is a section along the z—z cut line of FIG. 6.b.

FIG. 6.d. is a section along the X—X cut line of FIG. 6.b.

DESCRIPTION OF THE PREFERRED EMBODIMENTS

Making reference to the numbering used in the figures, we can see how the mechanism to tranfer mechanical power from an input to an output in a controllable manner, which the invention proposes, includes:

INPUT MODULE A

It is comprised of three basic components or groups: planetary group (a), toruqe limiting group (b) and driving power cutoff group (c).

Figure 1A:
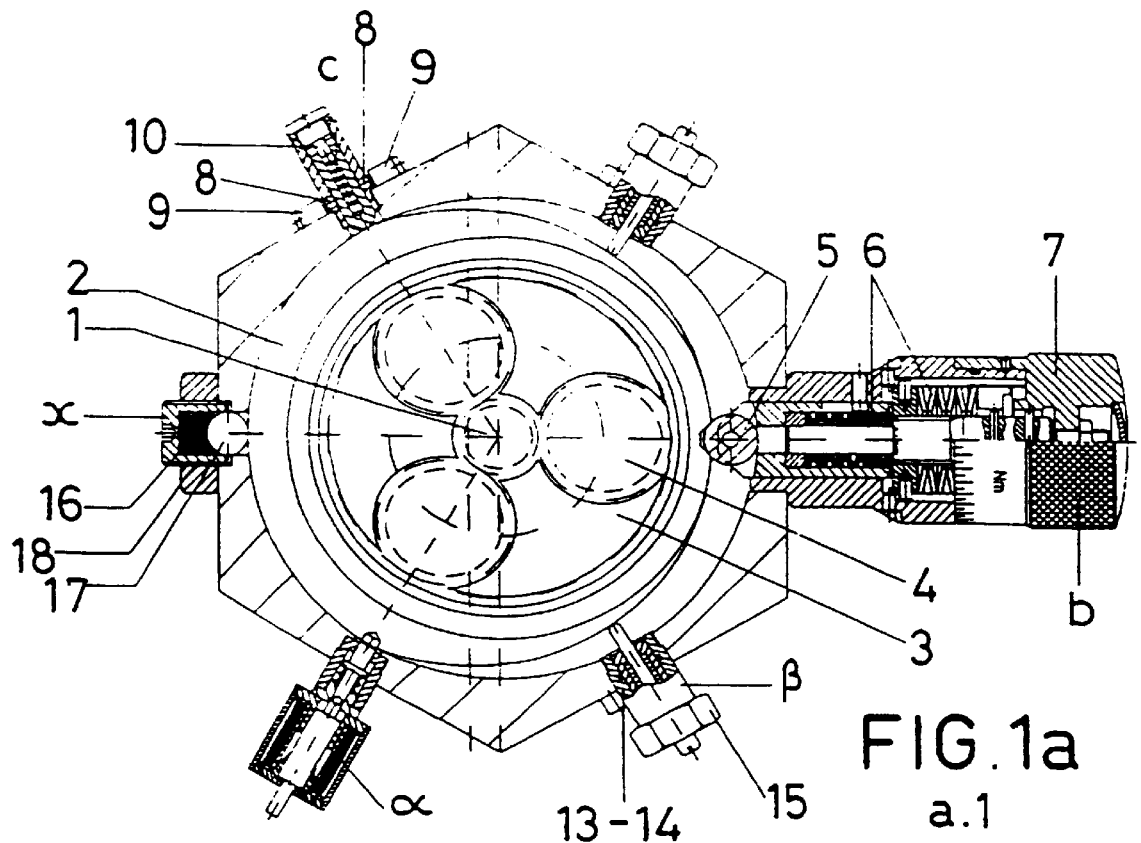
FIG. 1a is a partially sectioned plan view of the input module.
Figure 1B:
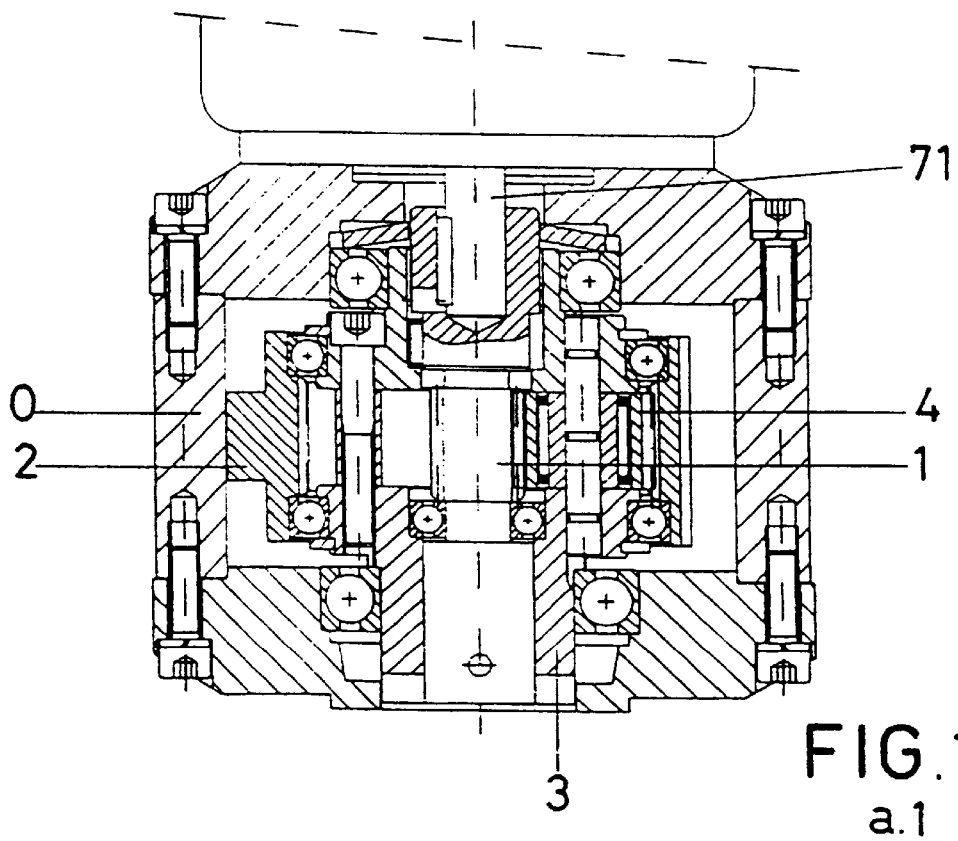
Figure 1C:
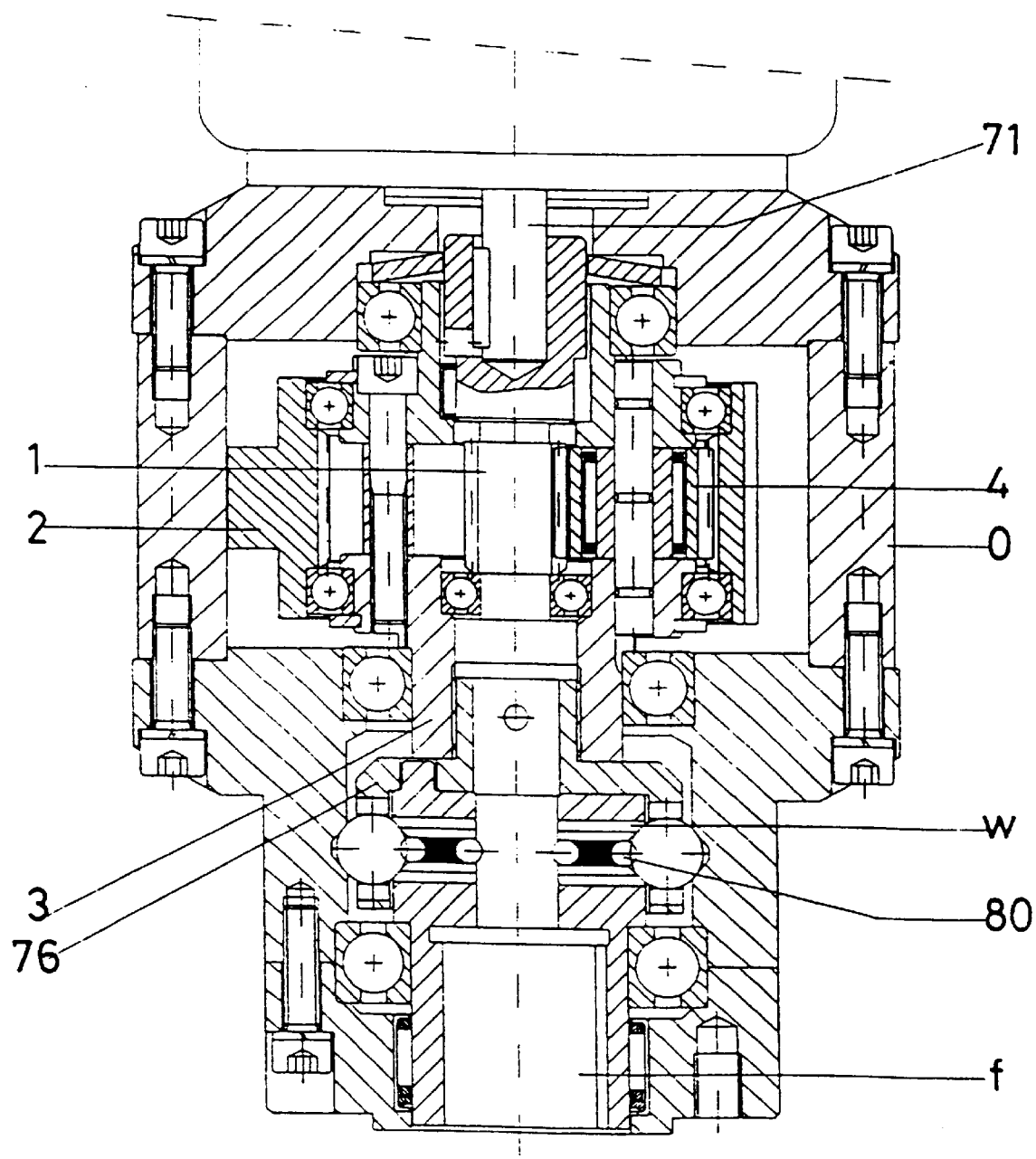
FIG. 1c is a corss-section view of the input module (a.1.) with the irreversiblility modeule (w) and the output module (f) assembled.

The planetary transmission group (a.1) consists of a gear planetary mechanism that has two (or more) cams (in FIG. 1, the pinion (1) and cam (1), and at least a planetary member holder arm (3), with its corresponding planetary members (4) whose locations and functional characteristics (when the functional complexity thereof so requires) are described hereinafter.

1 - Pinion (cam): pressed on the motor and gearing directly with the pinions (planetary cams) (4).

2- Cam: Center wheel of the planetary mechanism normally braked by one or several contact elements (pawls in FIG. 1, only one, part (5) that is housed in a configuration (in FIG. 1, a notch) placed for this purpose in this cam (2.))

Other configurations of the periphery of this cam (2) (in FIG. 1, an eccentric) that can be projections, grooves, etc. Actuate one or several microswitches (9) by means of a pushing ball (8) and of the signalling stop (10).

These latter configurations can be replaced by any mechanism and/or device that is capable of producing a signal (by means of cells, sensors or other systems.) Likewise, it can have other configurations or linking elements that produce the same effect and that are described as examples upon specifying in detail the additional devices of this FIG. 1.

The outside cnfiguration of this can may be toothed, so that one or several of the pinions can acts as this cam (2) with at least one curved surface either concentric, or eccentric, or in combination of both, cylindrical (or not) coaxial with the shaft thereof (or not), new configurations, notches and projections being able to be inserted in them; housings as well as notches and projections can be flat, circular, curved or with any other shape.

3 - Planetary member holders: Part (in the circular drawing) where planetary members (4) and mounted and through which, in this case, the movement and the torque resulting from the planetary mechanism come out. The planetary group of the shaft or output element. The planetary group can include one or several arms.

4- Planetary elements. Cams or pinions mounted on the planetary member holder arm (3), geared on the pinion (1) and in the cam (2).

Figure 4A:
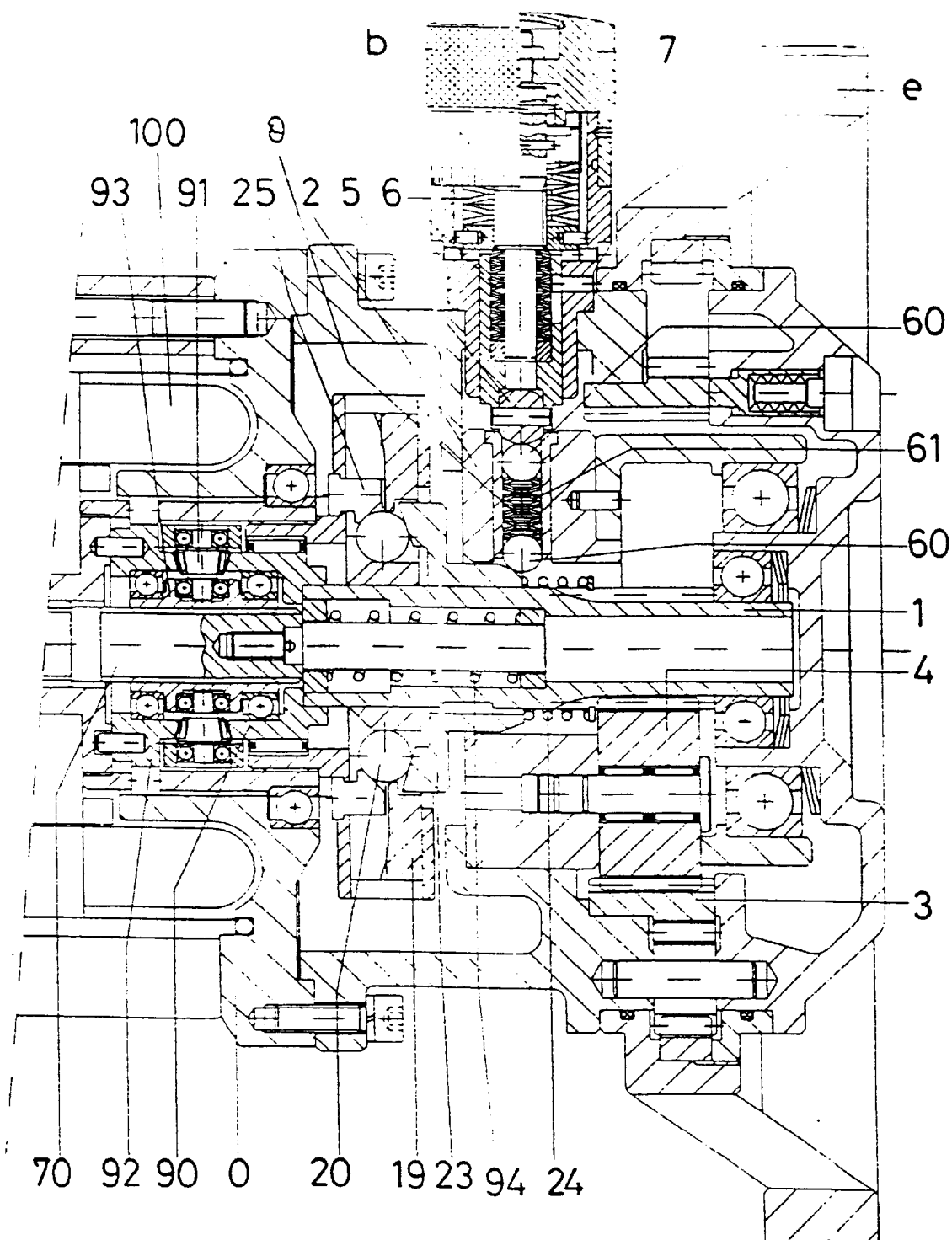
FIG. 4.a. is a cross-section of the input module (a.2.)
Figure 4B:
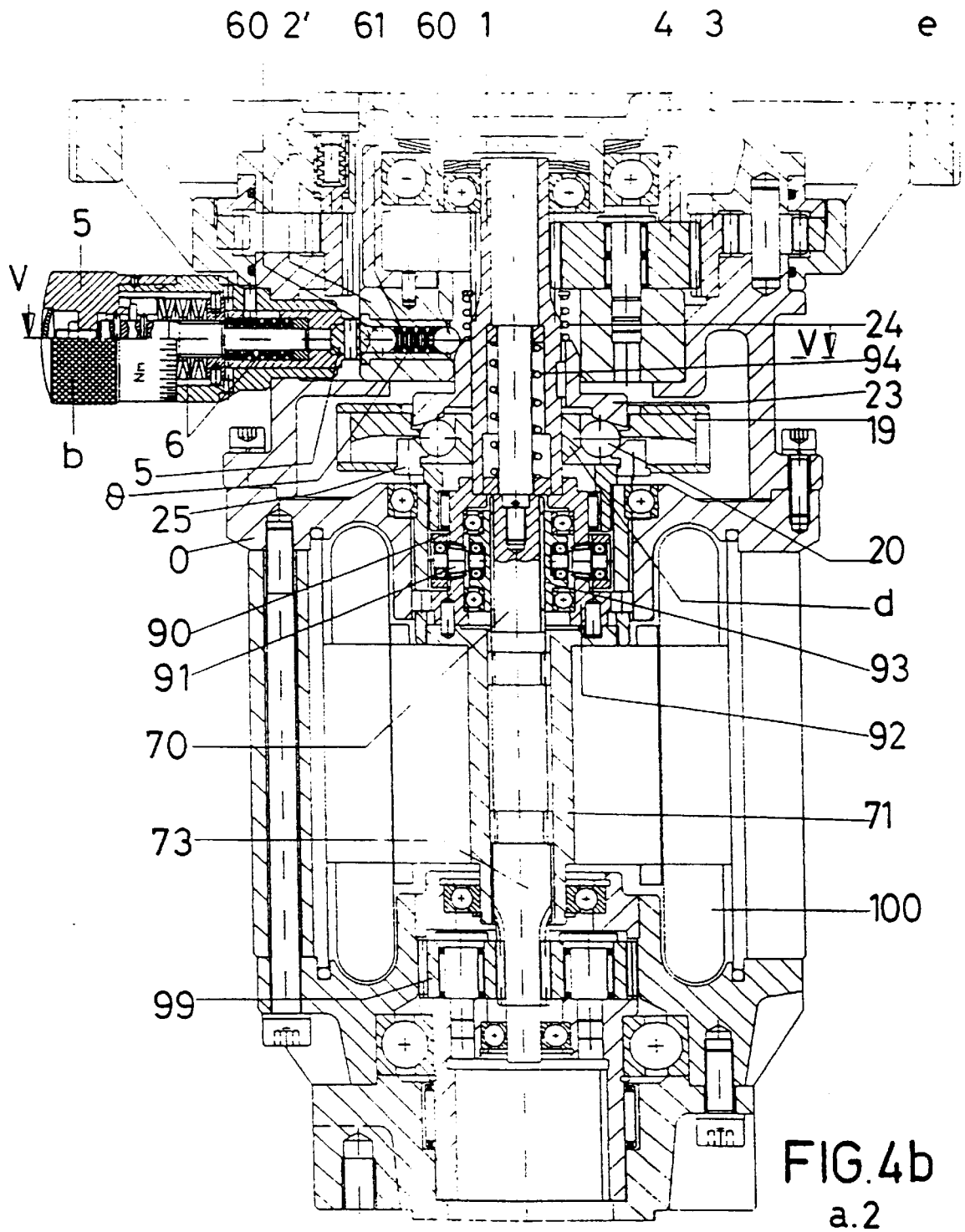
Figure 4C:
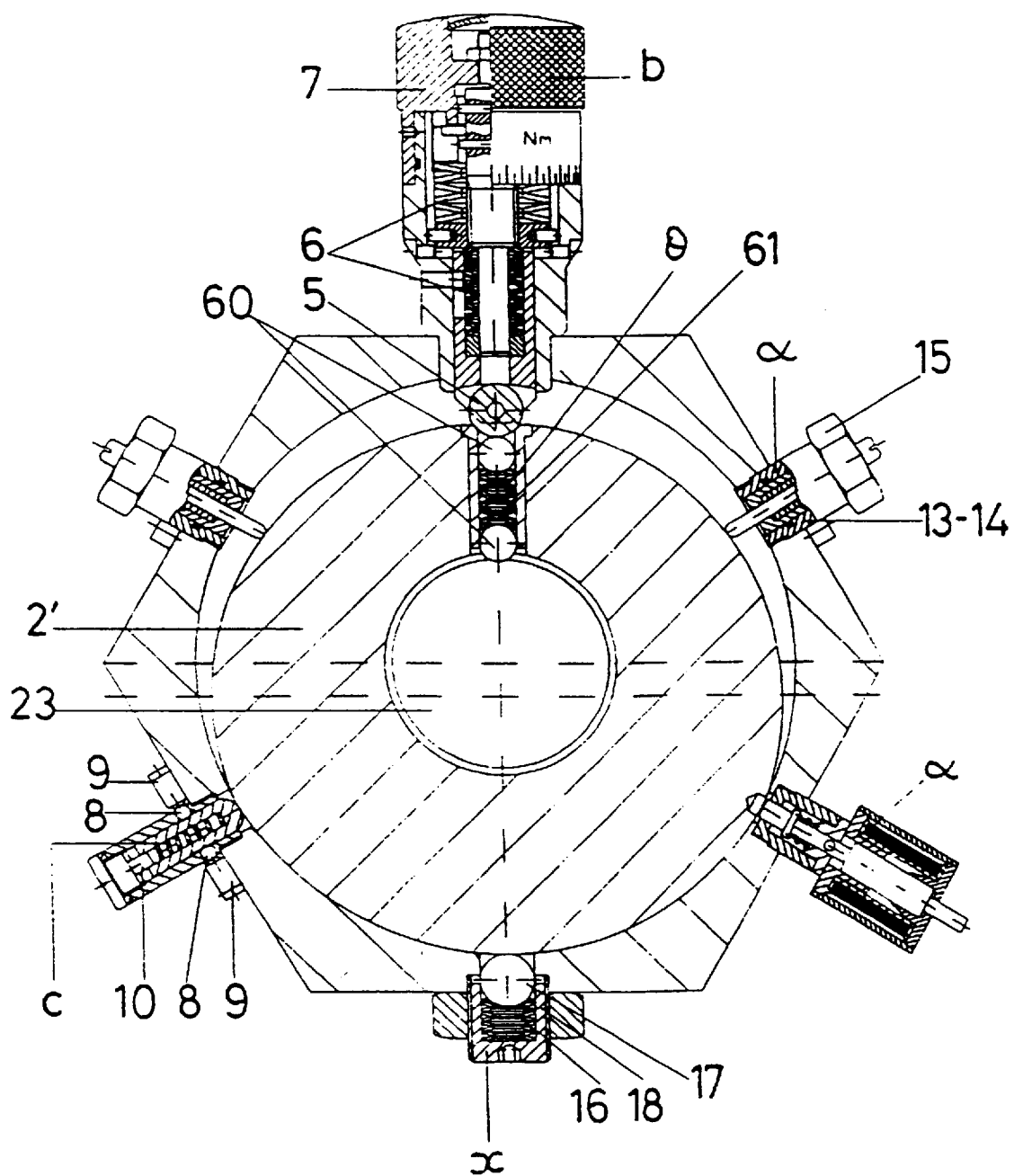

The second input module (a.2) is a planetary gear group that is comprised of two planetary gear mechanisms (FIGS. 4.a.b.c.):

a first planetary gear mechanism, in this case straight, that has a pinion (1), some planetary members (4), a center cam (3) and a planetary member holder (2) that is the circumstantially movable part of this input module (a.2.)

a second planetary gear mechanism, in this solution conical, that is comprised of a pinion (92), some planetary members (91), a output cam (90) and a planetary member holder (93), that is threaded inside with the thread (80).

Said input module (a.2.) also includes a cnetrifugual clutch group (19, 20, 23, 24, 25) as it will be described hereinafter in this specification.

This centrifugal clutch makes it possible to adjust, in terms of the speed of rotation, the locking adjustment mechanism formed by references (60) and (61); in terms of the outside shape of the part (23) that acts in contact with the contact element (60).

Said locking adjustment mechanism is described in more details in modules (a.3) and in (a.4.), that also uses it in its operation, with the particularity that in this module (a.2.) its operation is strictly linked to the speed of rotation of the mechanism.

This input module (a.2) differs mainly from the simpler input module (a.1.) in that it includes said second planetary conic gears (90, 91, 92, 93) in the circumstantially movable part (2) of said first planetary gear and in which it includes the torque adjustment mechanism (60, 61, 23, 19, 20, 24, 25) is included dependent on the speed of rotation of the mechanism.

All of that which has been said about the confirmation of the local center cam (of the input module (a.1.) and about the auxiliary elements that it includes is also applicable to this module (a.2.)

It likewise includes manual control module (e), though in this solution it does not need the centrifugal clutch group (d) (of FIG. 2.b.) for its connection or disconnection from the mechanism. On the other hand, it uses some straight gears that gear with the toothed outside part of the center cam (3) of the first planetary member.

The output shaft (73) (FIG. 4.B.) includes a threaded part (70) that allows during starting of the motor (100) that not enough torque is transmitted to start the movement in the output, but to move the shaft (73) axially, from the conical planetary member holder (93) threaded inside to said thread (70) that to said thread (70) having a long pitch (or even balls) and it permits low friction. To recover and return it to its initial position, once it has been stopped, the mechanism includes an elastic element (94) that is weak enough to not to impede movement of the shaft in starting, but strong enough to overcome friction upon returning it to its initial position.

The movement is transmitted from the motor (100) to the input element or shaft (71) and from this shaft to the cam (92) of siad (conical) planetary element. As long as the other cam (90) of said second planetary element is kept stationary the movement will pass through said cam (92) and from the planetary elements (919 to the planetary element holders (93) and from the latter to the output shaft (73).

Said center cam (90) will be kept statinary while said second straight planetary element is braked in its movement, given that it moves together with the pinion (1) of said second straight planetary member. If the manual control group (3) remains stationary the cam (3) will not move and, therefore, the only possibility of movement of said straight planetary member will be through the planetary element holder (2.) This will be kept stationary as long as the adjusted torque in the torque limiting group (b) and by the locking regulating mechanism is not exceeded.

In this way, upon exceeding said adjusted torque, said planetary element holder (2) is released and during its rotation the excess energy thereof is absorbed or taken advantage of in the same way as in the input module (a.1.) the cam (2) did so. Hence, at no times the torque transmitted to the shaft (73) exceeds the torque regulated in the torque limiting group (b), given that any excess is transmitted to the straight planetary element by means of the piniion (1) and absorbed by the planetary member holder cam (2).

The transmission group may have another configuration, in a predetermined way (a.3.) (FIGS. 5.a., b. C). In this configuration, the movement of the circumstantially movable part (2) is longitudinal (never turning movement.) This transmissioin group (a.3.) consists of a circumstantially moveable part (2) with a determined shape (in FIG. 5, hollow cylindric with a suitable cam profile) where the contact elements (5) are locked (in figure one, only one) of the toruqe limiting group with, at least two ball bearings (78) to allow good turning of the inside shaft (72) or (73) to part (2).

Said part (2) can likewise have a locking adjustment device (8) formed by two contact elements (in the figures, two balls) (60) and an elastic element (in the figures, Belleville rings) (61) between them. Said contact elements (60) located between said pawl (5) of the toruqe limiting group and the surface of the shaft (73) or (72) inside (2) in the figures a projection (68).

The locations and functional features (when the functional complexity thereof so requires) are described hereinafter.

2- Circumstantially movable part in a predetermined manner, normally braked in its longitudinal movement by one or several contact elements (pawls, in FIG. 1, only one), that is housed in a configuration suitable for that part in said part (2.)

Said part with a predetermined shape can have different configurations and shape in the cam profile (59) upon which said pawl (5) is moved upon exceeding the pre-set torque, depending on the greater or small progressiveness and durability that is to be given to said movement. It is clear that said shape of the cam profile (50)does not affect the instant breakdown of the transmission of torque when the pre-set torque is exceeded.

Figure 5A:
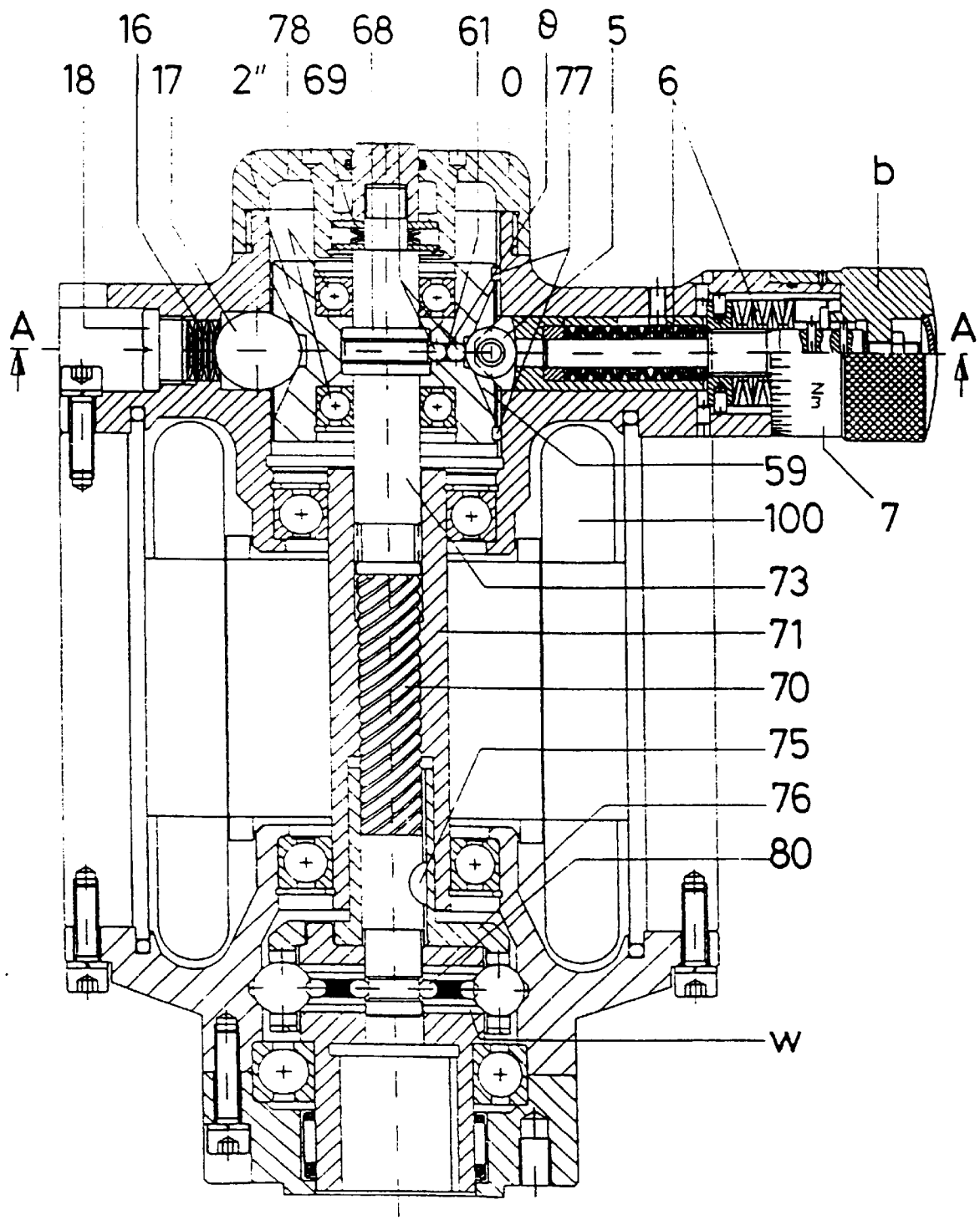
FIG. 5.a. is a cross-section of the input module (a.3.) including the motor (100) as a power input element of the mechanism.
Figure 5B:
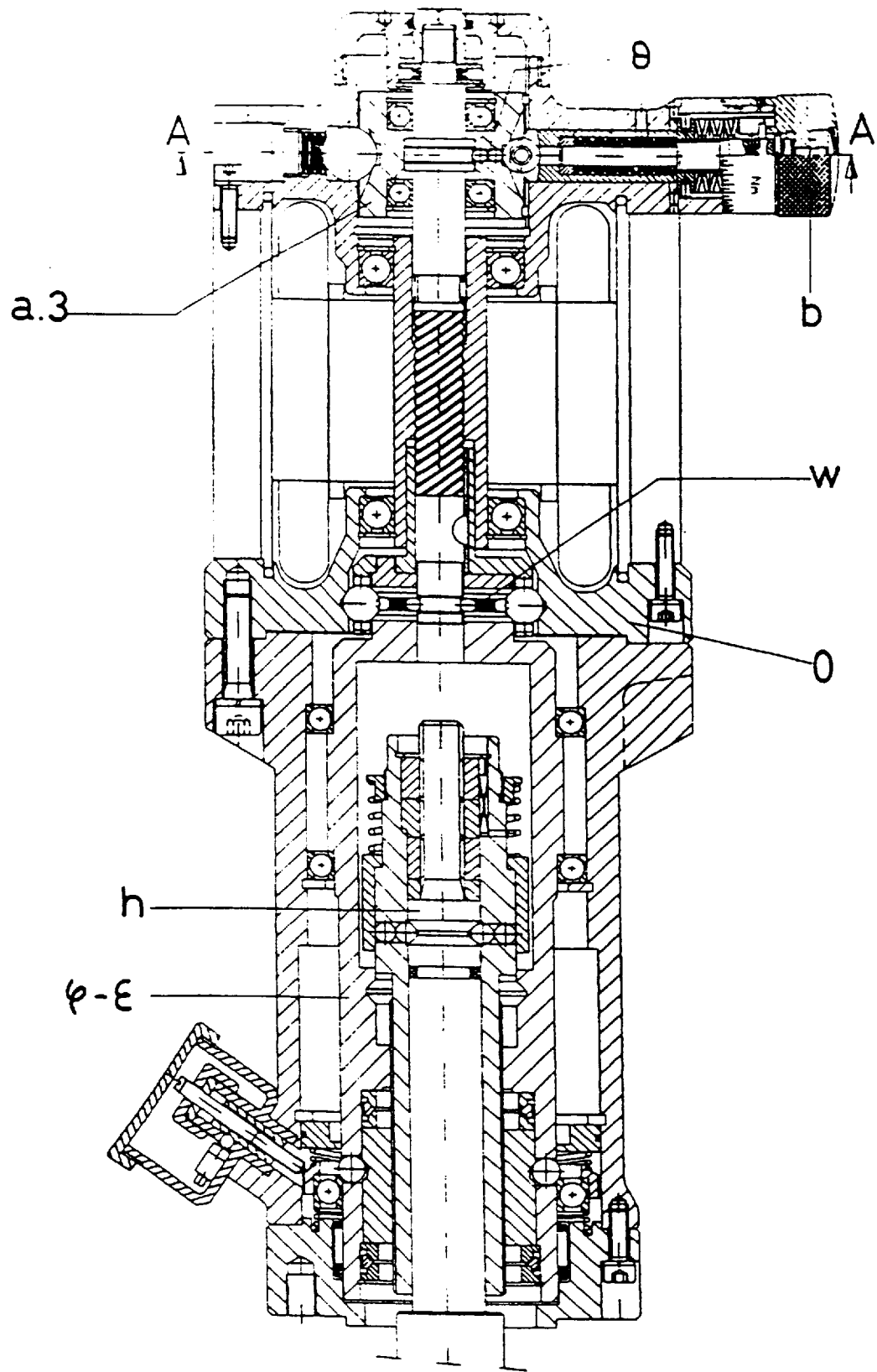
Figure 5C:
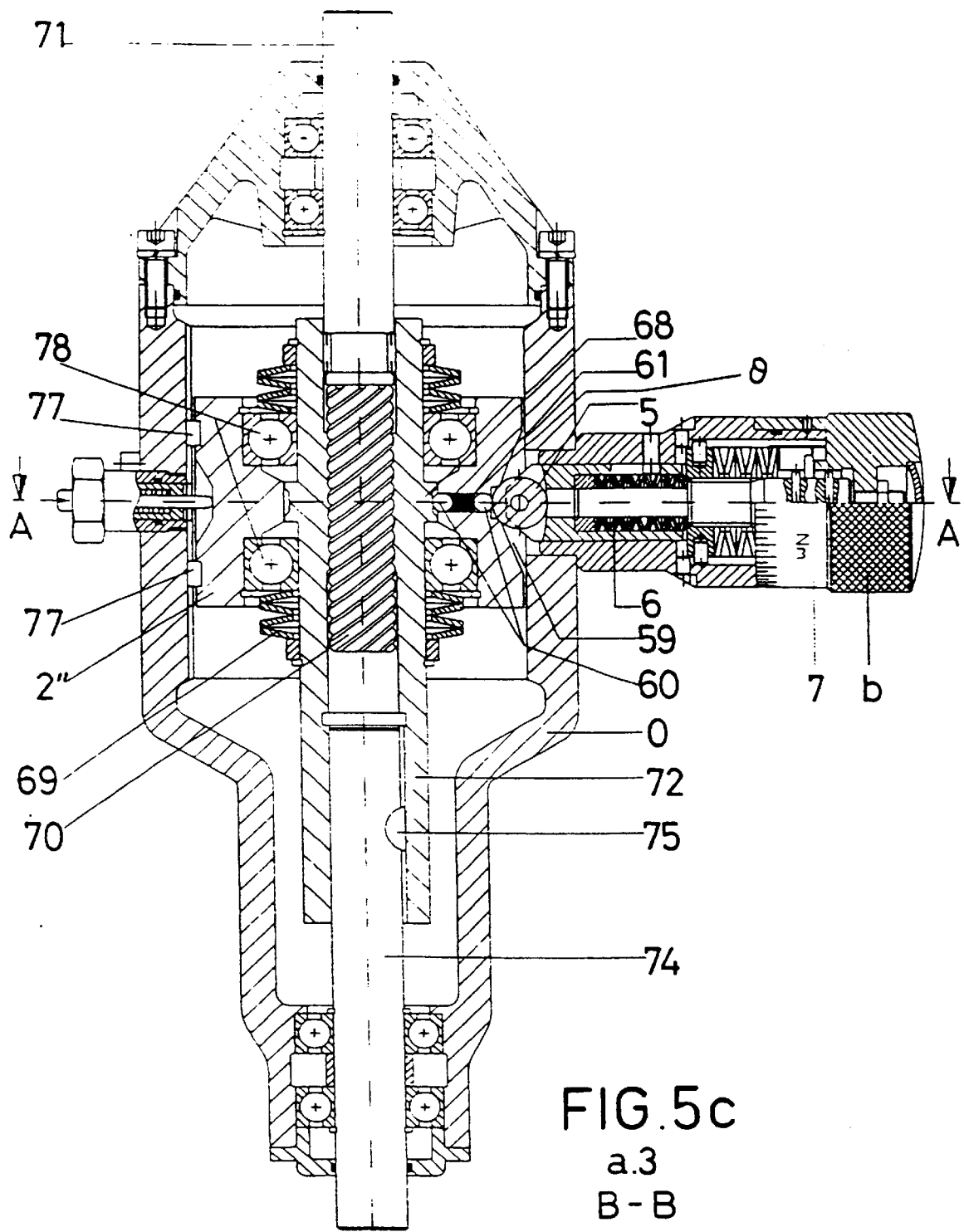
Figure 6B:
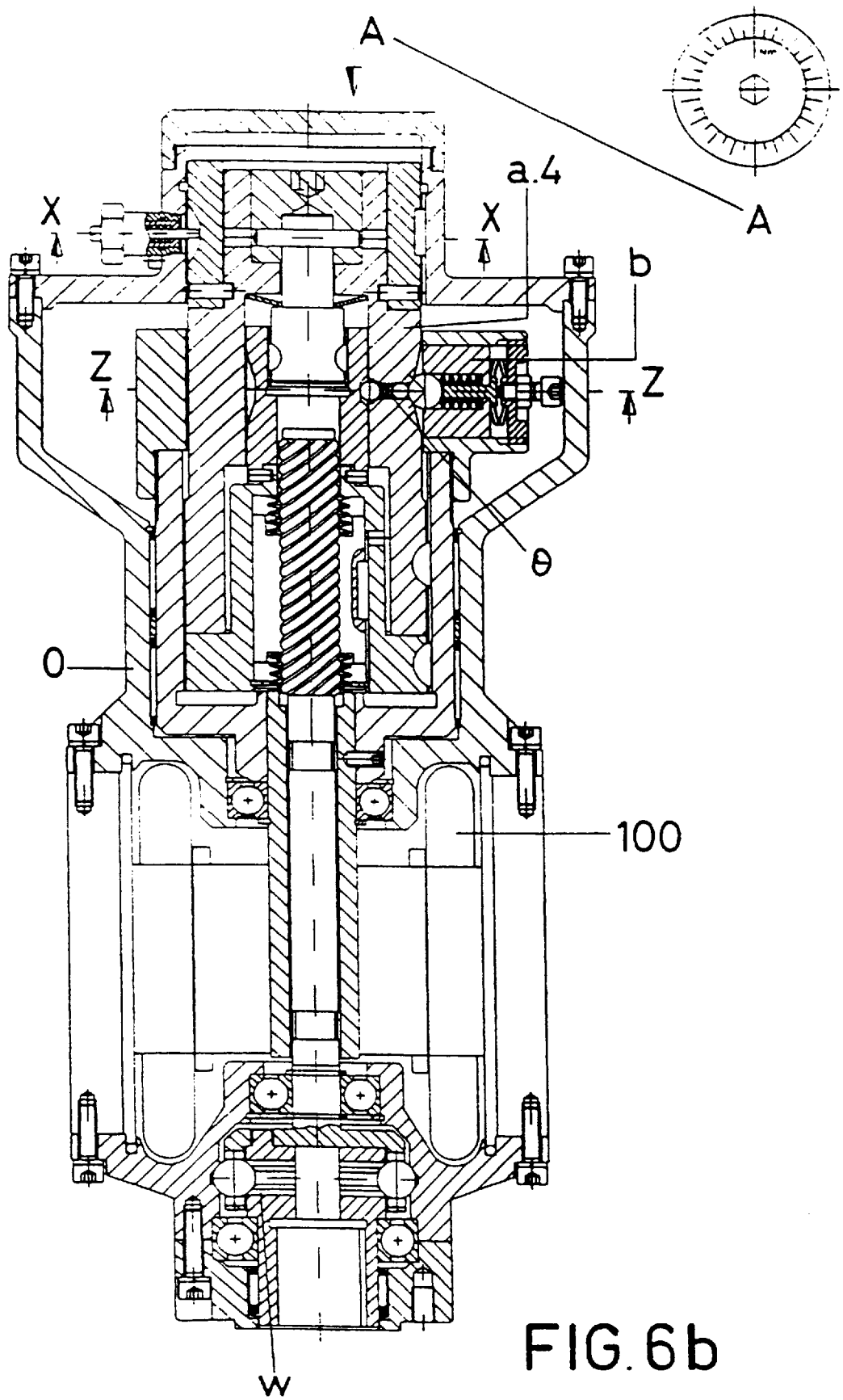
FIG. 6.a. is a cross-section of the input module (a.4).
Figure 6C:
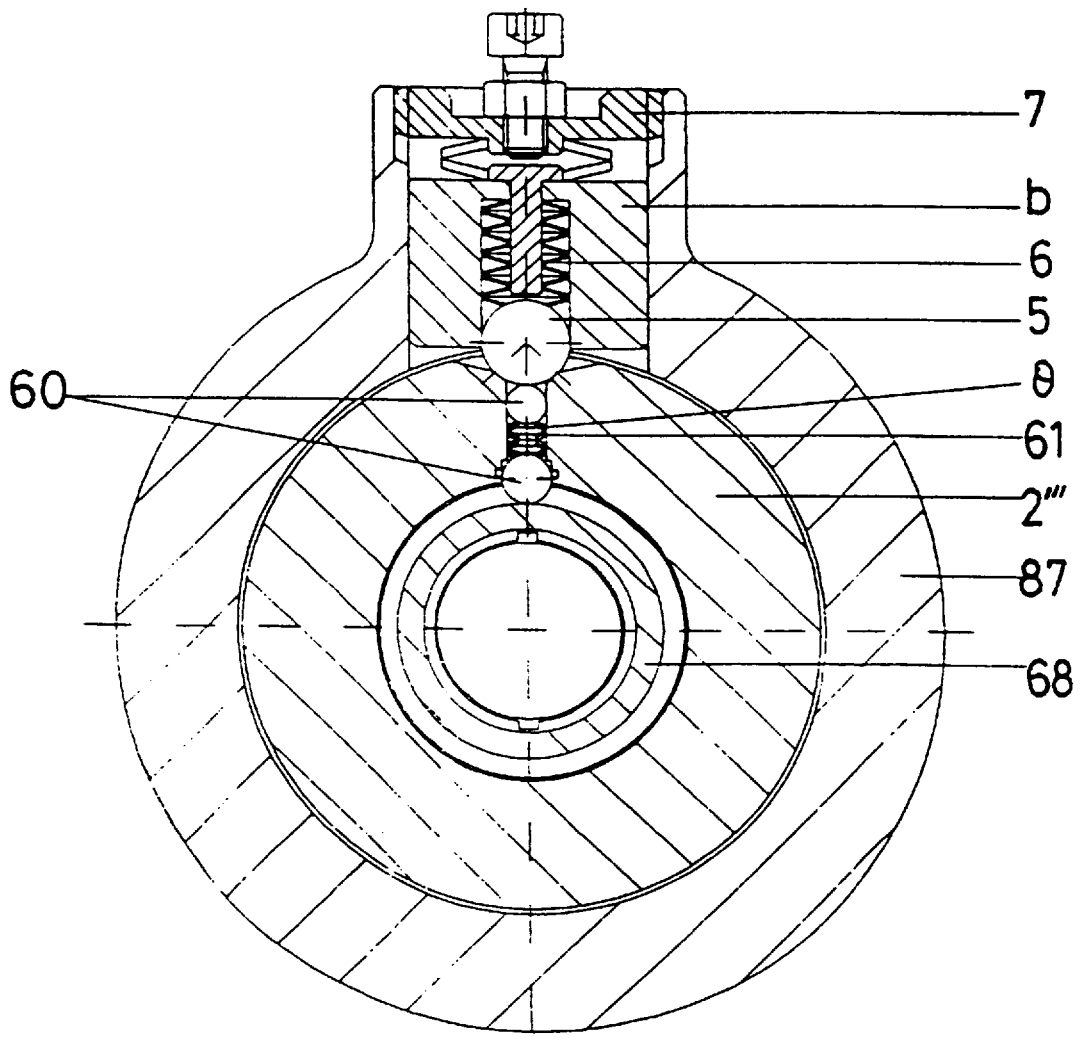
Figure 6D:
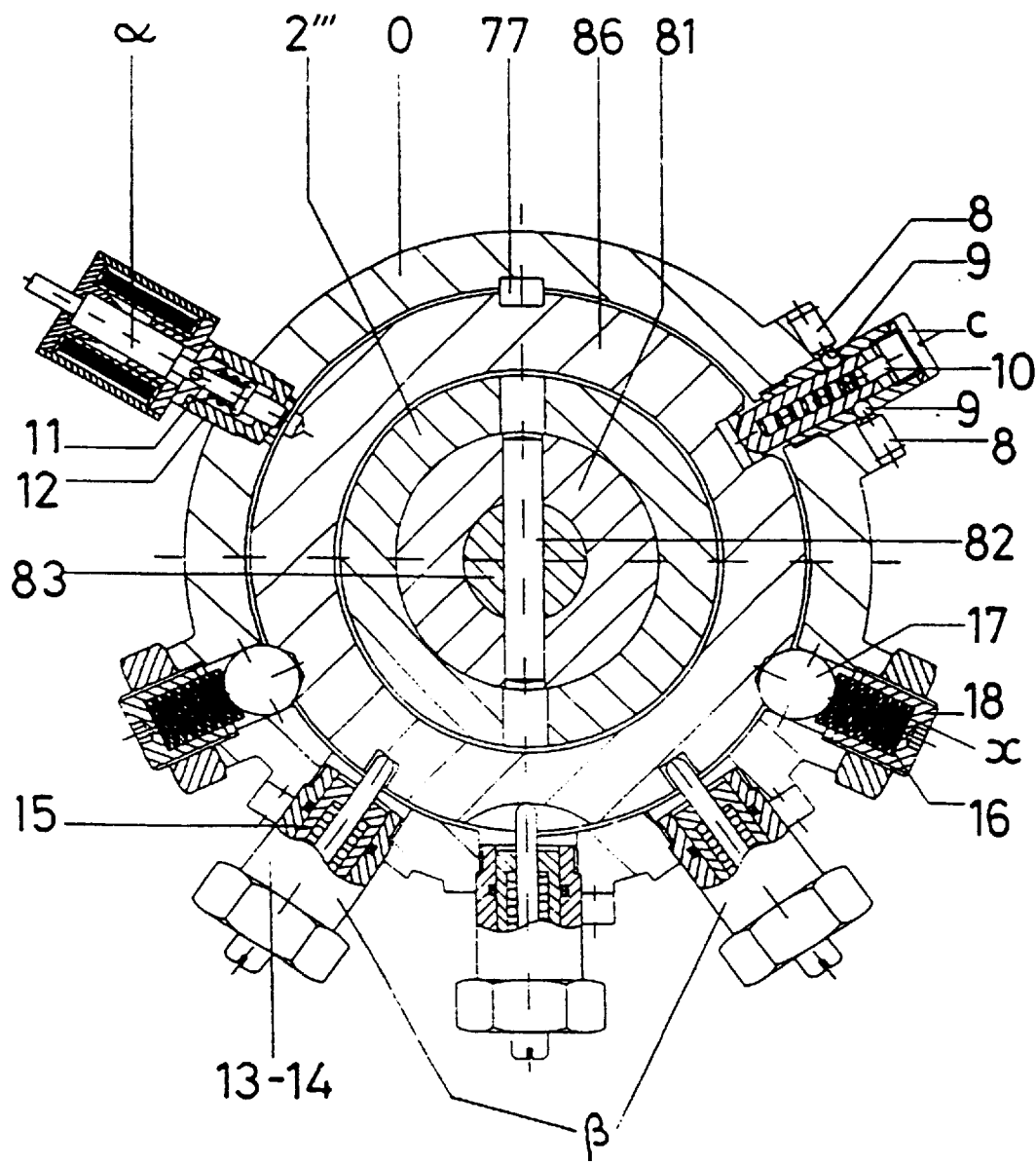
Figure 7A:
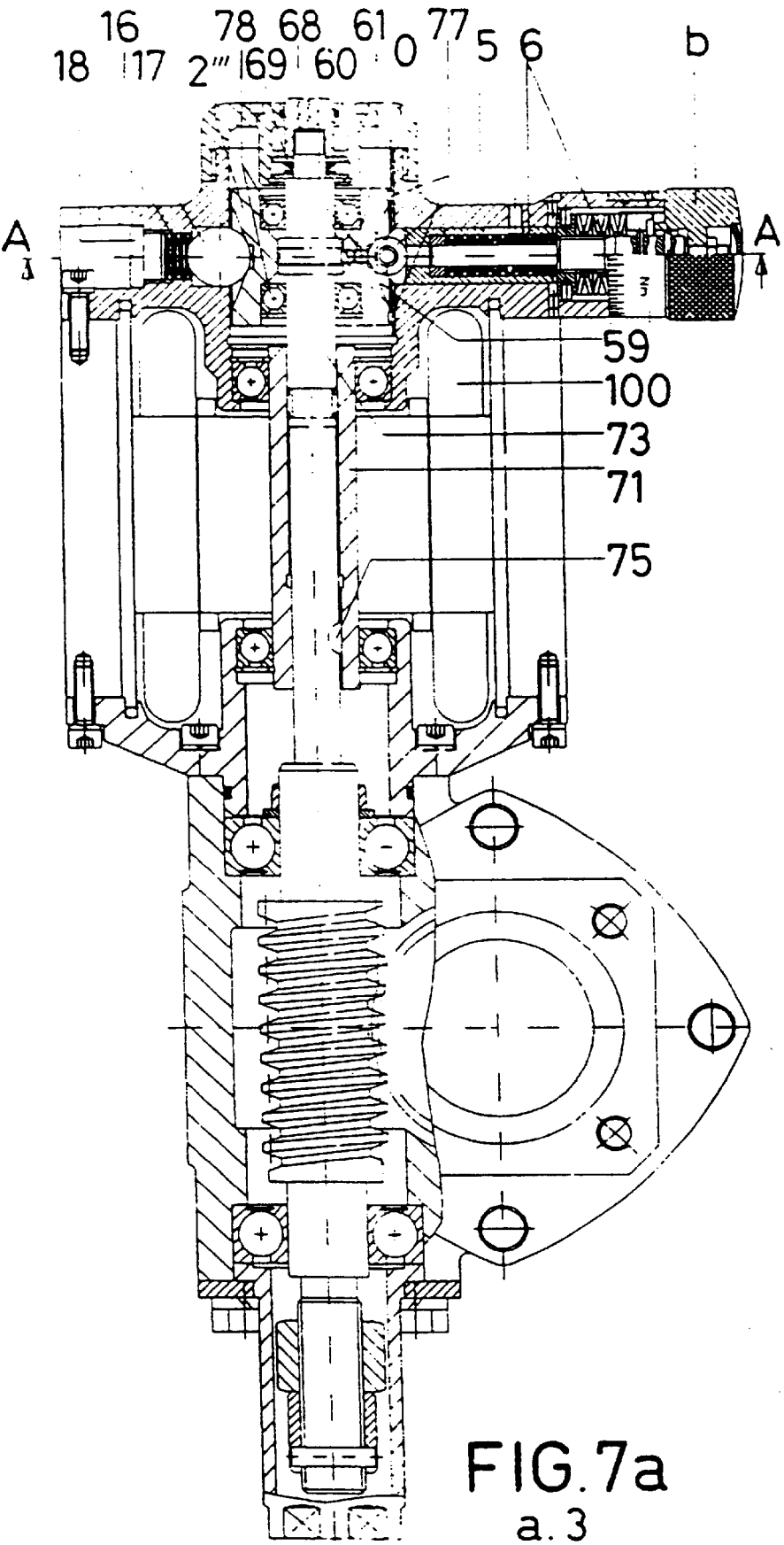
FIG. 7.a. is a sectioned view of a unit in which an endless-crown reducing mechanism has been adapted to the output of the input module (a.3.)

77 - At least two keys that prevent the rotation movement of part (2) fastening it to any stationery element (in FIG. 5. to the frame (O).

78 - At least two ball bearings, that allow free and well guided durnign of the shaft (72) or (73) inside said part (2).

60 - At least two contact elements (in FIG. 5 ytwo balls) that are kept in contact, each one, with the pawl (5) of the torque limiting group and with the projection (68) of the inside shaft.

61 - An elastic element, at least (in FIG. 5, forming Belleville rings) that keeps said balls (60) in contact with both surfaces.

68 - A projection in the shaft inside part (2) with a cnfiguration or shape so that upon the latter moving, in the starting up, the ball (60) forces contact with it towards the elastic element (61), thus reducing the adjusted torque to allow movement of the part (2) in its moment.

Said configuration or shape can vary depending on the operating needs.

In this case, references 60, 61 and 68 form the locking regulating group.

Finally, the input module (1) can have a more developed configuration, in a predetermined form (a.4.) (something similar to (a.3), with turning as well as longitudinal movement.

Said configuration consists of a unit formed by the toruqe limiting group (b) and the circumstantially moveable part (2) in a predetermined form similar to the one used in module (a.3) that turns together with the speed and torque that the shaft or input mechanism (71) transmits them.

Integral to this unit parts (88, 68. 81, 82 and 83) likewise turn thanks to the key (85).

This turning movement of the torque limiting group (b) applied on (2) in terms of the speed at which they turn, generally determined by the input element (71), usually contacted to a motor (100) or the like. Thus, by means of the regulating element (7), keeping said speeds in mind, it is possible to adjust the elastic element (6) that tightens the contact element (5) against the (cam) surface (59) of the truncated-cone-shaped part (2.) In this case, the driving power cutoff group (c) as well as the auxiliary elements are placed upon another part (86) characterized in that it only has longitudinal movement, integral to part (2), its turning movement being prevented by the key (77). In this way said auxiliary elements are activated in the same way and have the same configurations as in module (a.3.)

Hence, when the output shaft (73) encounters some obstacle (for example, the seat of the actuated valve), the transmitted torque increases and the speed of rotation drops.

When the maximum stress regulated by group (b) on part (2) is exceeded, the latter remains instantly releaseed and begins to move longitudinally; the characteristics of said movement depending on the shape of the cam curve (59) of part (2), upon which the contact element (5) of the group (b) will move.

Upon producing said release of part (2), the part will drag in its longitudinal movement part (86), therefore, actuating, all the mechanisms associated to said part (86).

This input module (a.4) likewise includes a locking adjustment mechanism (O) formed by references (60, 61 and 68). With the particularity that in this solution the inside curve that exposes part (68) to reference (60) in contact with it can be varied. In order to do so, one need only turn, in its position of rest, part (81) that, by means of the pin (82) turns part (83) that, in turn, by means of the key (85) turns said part (68) the latter showing a configuration different from the contact element (60) and as a result different toruqe adjustment. Said parts are not described due to the simplicity thereof.

In this way one achieves that the locking regulating element (O)acts on the contact eloement (5) in a different way, depending on the need.

(B) The torque limiting group (b) is a torque regulating and limiting mechanism of the output breaking down the input torque into two, by means of the circumstantially movable part (2), one that is the one used in the output and the other, excess, that is released (in general not only this release is produced but also the excess torque is damped) and used to cutoff driving power as well as to carry out checks. It has a contact element (ion FIG. 1, a pawl), an elastic element ( in the figures, some conical elastic Belleville washers) and an adjustment element (in FIG. 1, a micrometric screw) which are describged hereinafter using this FIG. 1 as a model:

5 - Pawl: Circumstantial immobilizing or braking part housed, on the one hand, in the notch of of the cam (2) and on the other, in the screw (7); remaining between the pawl and the screw an elastic element (6).

6 - Elastic element: Any type of elastic element (Belleville washers in the drawing) located between the outside of the rod of the pawl (5) and the inside of the screw (7) that presses it, varying the stress applied and therefore the transferable torque.

7 - Adjustment element: It is a device (in the figures, a micrometric screw) fastened to the body that adjusts the torque of the cam (2): In the outside there are some marks with different output torques and an index. In solution (a.4) said torque limiting group(b) turns integral to the truncated-cone-shaped part (2) in this way, though it is formed by the same elements (5, 6,7), its operation will depend on the speed at which both elements turn (centrifugal force.)(c) the driving power cutoff group, is a direct cutoff mechanism (or indirect cutoff, giving the cutoff signal) of the power, by means of contact, approximation or any other process (in FIG. 1, in contact and actuated by an eccentric (2).

It has in the figures a microswitch (8), a pushing ball (9) and signalling stop with a support spring (10) that are not described as they are very well known elements. Likewise, it can include other cutoff groups 10 (secondary, tertiary, etc.) for greater safety in the event that the primary cutoff group were to fail.

Besides, of the three basic elements or groups described, this input module can include one, two or three additional devices that will now be described:

(χ): Mechanical locking: Antagonistic device of the torque limiter, locking of the circumstantially movable part (2), actuated manually or by any other means, that is abutted to the body of the input module or any other intermediate element with the latter and consisting of a rod, latch or any other element capable of housing in a hole or notch placed for this purpose in the cam (2), that serves to brake it circumstantially, cancelling with this the action of the pawl.

This locking action can also be done by placing a screw or other immobilizing element of the torque limiter.

The rod (11) with its corresponding spring and the position sleeve (12) of the case of the figure, are not described as they are also known.

(β) General check: Device that makes use of the excess power and measuring it in a continuous or discrete way, in such a way that,wihout previous modification of the conditions of the torque limiter, its reduction means an incrsae of absorbed energy, which implies an anomaly in the unit formed by the actuator and the actuated element. If, on the contrary, the excess energy increases, it detects wear of any retainer or packing within the actuator-actuated element unit.

Measuring the variation of the excess energy can be done mechanically, electrically, electronically, optically, vertically, etc. Said measuring of the variation of the excess energy can be done for the movement of the circumstantially movable part in one direction, in another or in both directions of movement (opening, closing or both.)

In the figures, this measuring of the variation of excess energy is solved by one of the many possible electric procedures, by a microswitch (13), an action ball (14) and adjustment screw with a built-in spring (15),an indicator lighting up in-situ or on the control desk by means of any electronic position sensor that can pick up this measurement.

This checking signal can be picked up for recording and analysis by a microprocessor and come out on a printer.

This checking action can also be done by measuring the stress of excess power through the torque limiter itself.

(χ) Auxiliary damping. The damping device of the excess power, directly, or using the torque limiter itself (case of the figures) and/or increasing the force of the springs mounted on the signalling stop (10), or by means of a braking device of the part (2).

It can also be damped by increasing by any means the absorbed energy. In the case of FIG. 1, this device is comprised of an elastic element (16), a contact element (a ball, for example) (17) and a sleeve (18), which do not require further description.

INTERMEDIATE MODULE B

It is comprised of two basic components or groups: the centrifugal clutch group (d) and the manual controlgroup (e).

This intermediate module has enough individuality so as to be included not only between the input module and the motor group of this mechanism object of the invention, but also between the motor group and the rest of the components of any conventional actuator.

Likewise, this actuation mechanism can be able not to include this intermediate module, in those cases in which the advantages of the flywheel and centrifugal clutch are not considered neecessary or are not advantageous or are not compatible with the configuration of the input module (A), or else, it can include only the centrifugal clutch group and not include the flywheel and replace the latter by a disk placed in the shaft of the ventilator, in which one can insert a removable small handled, normally placed in the motor and allowing the continuity of current in the same, until the moment in which it is removed to insert it outside the disk that replaces the flywheel.

This latter system can also be used in any actuator in which case an intermediate module is not included.

(D) a centrifugal clutch group. Inserted between the motor group and the input of the planetary group consisting of a centrifugal clutch, which can also have a dead point, in its state of rest remaining engaged in a flywheel and after the motor group starts moving, the flywheel is disengaged, passing by the dead point and automatically engaging the motor. With such a centrifugal clutch group, whether or not it is completed with the manual control group, within the intermediate module, this serves to obtain stresses higher due to successive accumulations of kinetic energy in the motor, whose sum is higher than that produced by the maximum torque, as long as there in irreversibility at the output.

Figure 2A:
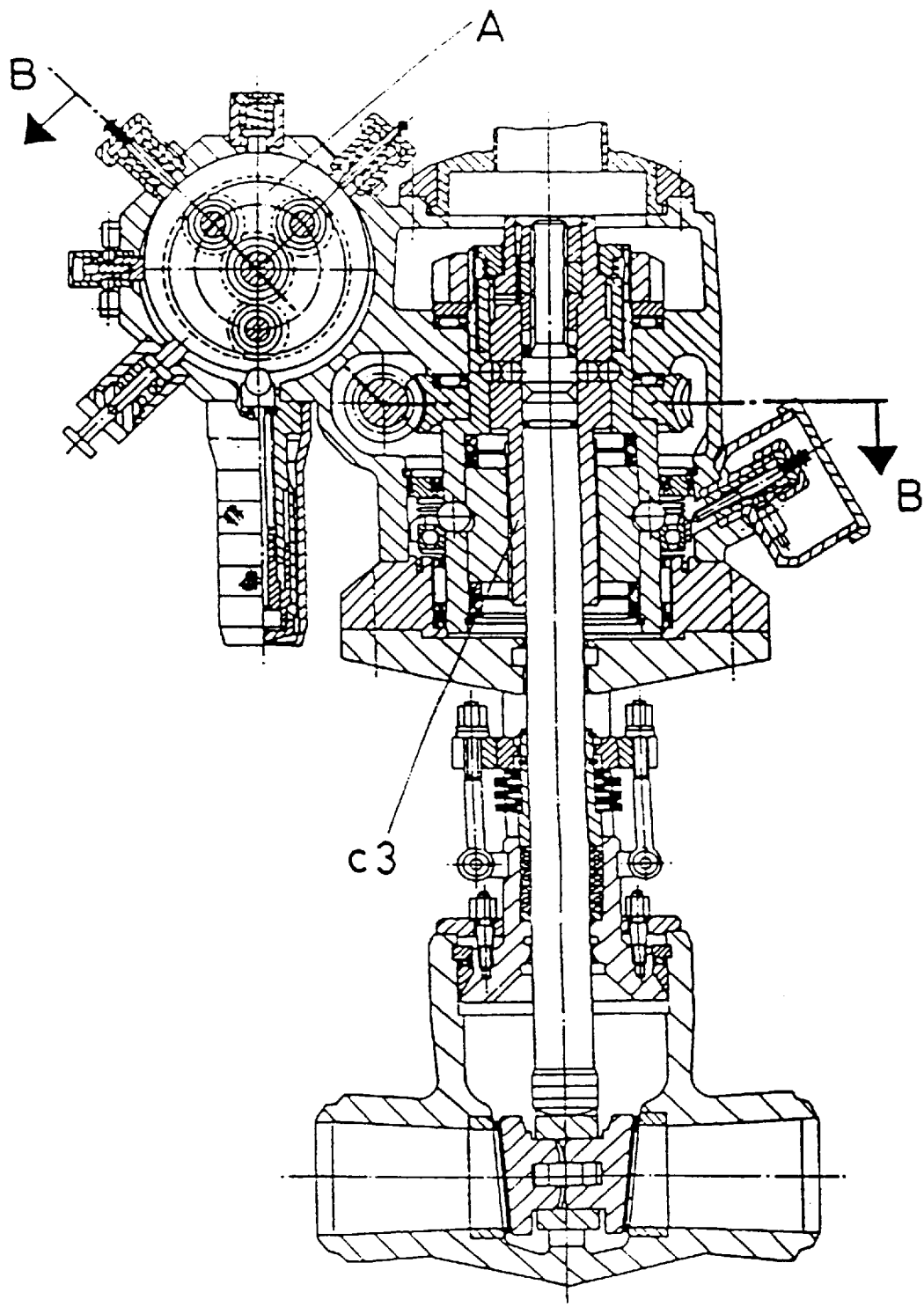
FIG. 2a is a sectioned view of the entire mechanism, on actuated equipment.
Figure 2B:
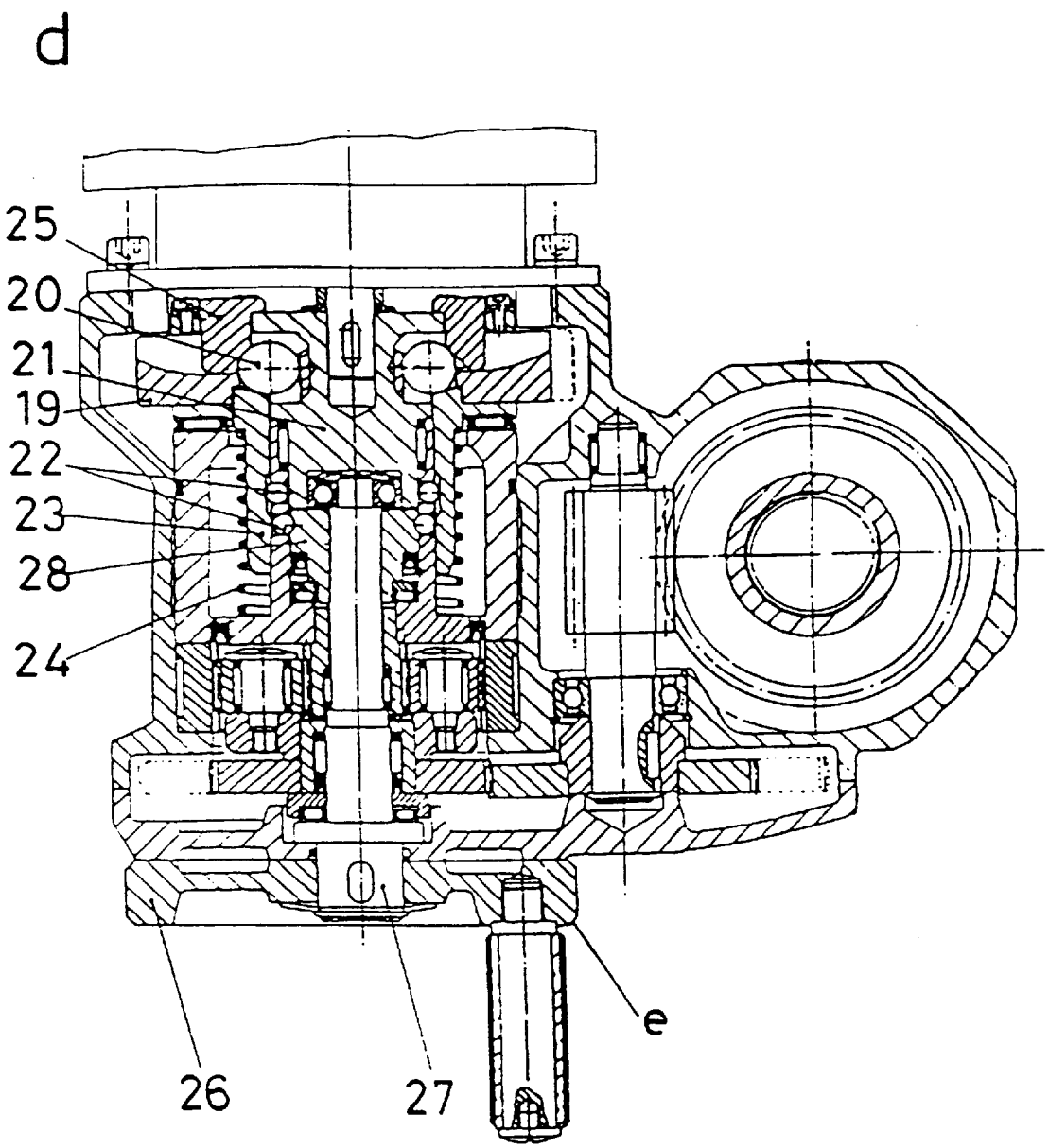

In the example of FIG. 2 this group (d) is comprised of the following elements:

19 - Movable pistons - Cylindrical pistons with transversal housing for the pushing balls (20) and a longitudinal groove for constant alignment thereof upon housing the guide supports (25) in them.

20 - Pushing balls - The centrifugal force thereof and that of the movable pistons (19) causes them to move along the inclined plane of the guide support (259 pushing the sliding bushing (23).

21 - Main body - It couples to the movable part of the motor and circumstantially to the pinion (1) of the in/out of the planetary group. In its top part it has some cylidnrical housing for insertion of the movable pistons (19) and fastened to it the base of the guide supports (25).

In the bottom outside part thereof there are some circular section housings to include the drag balls (22), while in the bottom inside part there is a bearing for better alignment of the shaft of the flywheel (26).

22 -Drag balls - They are placed in two grups. In some there is coupling and decoupling in the grooves of the main body (21) existing for this purpose. The second group carries out the same function in the grooves of the end of the shaft of the flywheel (26). Both groups are always housed in the drilled holes of the pinion (1).

23 - Sliding bushing - It slides by its inside part in the outside of the pinion (1), which limits its run. In its bottom part it has a Or-ing cylindrical housing for inclusion of the drag balls (22) the the corresponding clutch is released. This inside cylindrical part, in accordance with its position, prevents the alternative centrifugal deblocking of these balls. First, in the position of rest thereof, the balls that fit in the end of the main body (21) are released; in the dead point the two groups of balls are housed in this cylindric housing and then the bushing sliding to its stop, the group of balls that drags the flywheel remains housed in it, remaining coupled by the contact thereof with the sliding bushing (23), in the bushing with housing (28).

24 - Resisting spring - It has the taks of returning the entire mechanism to its starting position, upon reducing the centrifugal force, by reduction of the revolutions of the motor.

25 - Guide supports - They are fastened to the main body (21) and they have the task of guidng the movable pistons (19) and forcing the pushing balls (20) to move.

The drag balls (22) and the channels can be replaced by keys, dragging teeth, friction cone, etc., considering these elements in a broad and never restrictive manner.

(E) the manual control group consists of an actuation system alternative to the motor, without ever losing the preference of the motor, when in cases of emergency (such as the lack of electric power, for example) there is the need to actuate the actuator. This group consists of a flywheel (26), a center shaft (27), which in turn acts as a guide support of part of the cams that comprise the mechanism and finally, a bushing with housing (28) for one of the drag ball groups (22).

These components are not defined as they are very well known.

IRREVERSIBILITY MODULE

It is comprised of a mechanism that can be placed in different positions within the energy transfer mechanism. Thus, it can be included in the input module (A) or between said module and intermediate module (B), or, even between the intermediate module (B) and the output module (C).

This irreversibility module transmits the torque of the input shaft to the output shaft of said mechanism, and during the transmission of said torque it blocks any movement of the output shaft in the direction of rotation contrary to that of torque transmission. And once the transmission of said torque has ended, it blocks any movement of the output shaft in any of the two directions of rotation.

Said irreversibility mechanism, combined with the centrifugal clutch, makes it possible to obtain higher stresses due to successive accumulations of kinetic energy in the motor, being higher than that produced by the maximum torque.

OUTPUT MODULE C

The output of this mechanical power transfer mechanism, that the invention proposes, is comprised of a single basic group, though and in terms of the characeristics threof, it can come in four different output variants, alternative between them and combinable with the rest of the modules and above groups, as well as with the additional devices. These variants are:

C1=rotating output module—(FIG. 3.1)
C2=threaded output module—(FIG. 3.2)
C3=output module with muiltiplier I (FIG. 3.3)
C4=output module with multiplier II (FIG. 3.4)

(C1): Module C1 is comprised of the group with the bushing (f) in which this bushing (29) carries out the function of a charging cell with the particularity that the key (30) is helicoidal (with reversible thread), whereby the axial movement of the bushing (29) produces a sag in the elastic element (31), generating a signal. These signals generated by the displacement of the bushing (29) are collected mechanically, acustically, optically, electrically, electronically, etc. (In FIG. 3.1 a microwithch pack), being used for the maximum torque checking device ($\delta$) as well as for the packing retightening signal device ($\epsilon$).

($\delta$): Maximum torque checking: additional device that takes advantage of the checking signal given off by the group (f).

In the figure it is comprised of a sliding ring (32), an intermediate ball (33) and a microswitch pack (34), which do not require further description.

This microswitch pack (34) can be replaced by any mechanical, Optical, elelctronic element, etc., that carries out an equivalent function, of generating a signal that can be picked up directly in any amplifier or indirectly registered by microprocessor and printer or any other registering means.

($\epsilon$): packing retightening signal. Device that by the above cited charging cells (29) and, at times, even, by means of the same signal elements, or else independently, we are notified of the wear of the packing of the actuated element.

In the event that the output module is of a type of the group threaded inside (C2) or group with multiplier (C3) and (C4), the floating output nut, installed between the elastic elements, moves without turning and proportionally to the force exerted on the packing, and, upon this varuying, the signal is produced which gives the order to retighten to another auxiliary actuator that is the one that carries out the retightening, by means of the electroclutch or actuator existing for this purpose.

In the event that the output module is of the rotating type (C1) the action of the nut is replaced by a bushing threaded outside, also floating between two elastic elements, in which the reversible outside thread acts as a helicoidal cotterway.

(C2): Module C2 (FIG. (3.-2) is comprised by the floating nut group (g), which aside from absorbing the dilations of the output rod, due to thermal dilation, it also serves as a charging cell that warns of variations of the passive resistance conditioins (for example, frictions, lack of lubricant, etc.) due to axial movement.

This group is comprised, in FIG. 3.2. of a floating nut (38), a key (39) and the elastic elements (40) that do not require further description.

The threaded output module C2 can have up to two additional devices: the device for checking stresses on the rod and the packing retightening signal device (the latter already described), which can also constitute independent units so as to adapt to the integral actuator likwe the existing conventional ones.

($\rho$): Checking of stresses on the rod: It is an additional device built and included expressly for this checking function, from the signal given off by the floating nut group (g) in figure (3.2) it is comprised of:a sliding ring (35), an intermediate ball 36) and a microswitch pack (37), that are not going to be described due to their simplicity.

In the case of the output module of the grup (g) type as well as in those of types (h) and (i), the variations of load in the axial displacement of the group converts into sagging of the elastic elements, which are picked up by the additonal devices (ρ) and (ε). (C3): Module C3 is comprised of an output group with multiplier I (h), which takes advantage of the principle that, for a single torque, at a smaller pitch and thread dimaeter, the greater the resulting stress.

Upon linking a big diameter thread with another one of a small diameter we obtain, with the first one rapid movements and of low stress to overcome the passive forces and, then, slow movements of high stress with the small diameter and pitch thread. For this it suffices that the first one stops against the second one, thus convert into a helicoidal cotterway.

In this mechanism, upon starting movement, the small diameter thread always does so.

The greater thrust effect has already been produced in FIG. 3, trhe actuator has stopped and this is ready to start, when ordered to do so, the backward movement.

Upon initiating circular movement the main nut (41), its thread acts as a helicoidal cotterway, dragging in its rotation the nut (42) as its diameter and pitch are smaller and since longitudinal movement thereof is prevented during the housing of the rigid element in the canal the coupling (47) and causing the spindle (48) to move (this latter immobilized to turn by a key placed in its opposite end, outside of the figure)until reaching its stop in which it faces the shaft of a throat made in it with the shaft of the rigid element (46) and that of the circular canal of the coupling (47) (FIG. 3.3b) and as of this moment the smaller diameter thread becoming a helicoidal cotterway, thus forcing the sleeve or the double thread nut (42) to turn, as the rigid element (46) no longer prevents its, which has become housed in the throat of the spindle (48), following the path of the latter until the floating bushing (45) prevents the escape outside of the rigid element, remaining at the end of its path waiting for the order to return in the reverse direction (FIG. 3.3c). Upon the nut turning in the opposite direction and for following the rigid element housed in the circular canal of the spindle (48) forced by the floating bushing (45), the smaller thread of the nut (42) becomes a helicoidal cotterway, thus moving this nut until reaching its stop, in which the shaft of the rigid element again faces the circular canal of the coupling (47) and the canal of the spingle (48) (FIG. 3.3b) converting in this instant the thread of the main nut (41) into a helicoidal cotterway, while the thread of the small nut is no longer a cotter way and its rotation moves longitudinally the spindle, transmitting in this phase the greater stress until the starting point thereof is reached, repeating the cycle again. (FIG. 3.3a.) This group (h) is comprised of the following elements in FIG. 3:

41 - Main nut. It is the nut that may or may not float, that converts the circular movement (stress) into linear movement.

42- Double thread nut - It is a bushing with an outside thread with a larger diameter than the inside one, with the double function in both as thread and helicoidal cotterway. One or several rigid thrust element(s) is/are housed in thehis nut (in the figure two balls.) Due to mechanical needs these threads can be bushings inserted in a sleeve, both of them as well as one of them (in the figure only the one with the smaller thread is inserted).

43 - Key. In the drawing the bushing threaded with a smaller diameter is linked with the double thread nut (42).

44 - Stop bushing. It regulates the limit run length of the spindle (48) through the smaller diameter thread.

45 - Flaoting bushing. It releases or fastens in its movement the rigid element (46). It can be replaced by continuity in the adjustment area of the double thread nut (42), in the cases of a short run.

46 - Rigid element. It may be one (or more) ball(s), a cylindric pin with the tips formed and, in general, any auxiliary element that can comply with the above cited operating conditions.

47 - Coupling - Bushing with inside circular canal for cirkcumstantial housing of the rigid element and simultaneous immobilization of movement by means of the nut.

48 - Threaded spindle. Final element that carries out the sum of movements caused by the main nut (41) and the one with a smaller diameer and, partially, in each instant, the stresses corresponding to each one of the movements.

(C4): Module C4 is comprised of an outlet group with multiplier II (i), which carries out the same functions and in the same sequence with the diffrence that, instead of having a rigid element and a floating bushing, it is provided with a coupling (53) and an elastic element (52) that regulates the pressure of the above so that it always happens that the friction torque of the coupling is greater than the difference of torques between the larger diameter thread and the smaller diameter one, for the same thrust pressure (FIG. 3.4).

It is comprised of the following elements: main nut (49), double thread nut (50), key and threaded spindle (54), already described in group (h), as well as:

52 - Elastic element: Spring, Belleville washers or any other elements that provides pre-set pressure to the coupling cone (53.)

53 - Coupling. Conical, flat, toothed etc. (Conical oin the figure) that makes it possible to transmit the torque that forces into action the main nut instead of the small one, in module (C3) as well as in module (C4) the conventional threads can be replaced by low friction ball bearings and, therefore, with high effeiciency, that makes it possible to improve the overall operation of said output modules (C3) and (C4).

I claim:

1. Mechanical-kinetic instant limiting and retaining servomechanism of the torque or stress transmitted by an input shaft or mechanism or output shaft or mechanism, being able to vary the torque and/or force in the output during the run thereof automatically in function of the speed with the possiblity that without increasing the input power or the regulated output torque, the stress can be sporadically increased, including:

a mechanical energy input (1, 93, 73);

a mechanical energy output (3, 73);

transfer means (2, 2', 2", 2'", 3, 4, 70, 75) of energy from the input (1, 93, 73) to the output (3, 73);

control means (5, 6, 7,. 60, 61, 2, 2', 2", 2'") to control the transfer means (2, 2', 2", 2'", 3, 4, 70, 75) in such a way that the energy transferred to the output does not exceed a pre-determined level; characterized in the control means comprise:

a circumstantially movable part (2, 2', 2", 2'") sensitive to the transmitted torque or force, through which said force or torque is transmitted to the circumstantially movable part (2, 2', 2", 2'") being placed in such a way that it immobility implies the transmission of said torque or stress to the output (3, 73) and its mobility implies the non-transmission of said torque or stress to the outlet (3, 73), a torque and/or force limiting group (b) that is placed in closed contact with the circumstantially movable part (2, 2', 2", 2'''), preventing or allowing suddenly the relative movement thereof and that includes at least one mechanical contact element (5) and at least one elastic element (6);

means to take advantage of the kinetic energies of the movable elements and unfolding the unit formed by said energies plus the dynamic energies in two well defined pairs of forces or torques:

the one applied to the output, including the passive ones, which are kept within some margins in accordance with what is needed in each case; and the excess with the corresponding passive ones thereof; and also characterized in that it includes means to pre-set, by means of the elastic element (6), the stress that the torque and or stress limitng group (b) exerts on the circumstantially movable part (2, 2', 2", 2'''), the circumstantially movable part (2, 2', 2", 2''') having a special configuration that, upon moving causes at least one signal for the subsequent use thereof;

a total or partial absorption of the excess power, avoiding that this effects the output (3, 73);

the absorption of said excess power depending on the geometry of the circumstantially movable part (2, 2', 2", 2'''), on its elasticity and on its relative movement with regard to the mechanical contact element (5).

2. Servomechanism, according to claim 1, characterized in that torque or stress limiting group (b) includes an adjustment and regulation element (7) that allows adjustment of maximum torque or stress to which said torque or stress limiting group (b) permits relative movement of the circumstantially movable part (2, 2', 2", 2'''), the adjustment and regulation element (7) being related to the elastic element (6) in such a way that this regulates the stress that the mechanical contact element(s)exerts (exert) on the circumstantially movable part (2, 2', 2", 2''').

3. Servomechanism according to one of the claims 1 or 2, characterized in that the circumstantially movable part (2) is the outside cam of a planetary gear mechanism, said cam being placed in such a way that it can have rotation movement over its own shaft; said mechanism comprising, at least:

a frame (O)

an input shaft (71)

a pinion (1) or cam fastened to said input shaft and that gears directly with planetary cams (4)

planetary element holder (3), where the planetary cams (4) are mounted and through which, in this case, the movement and resulting torque of the planetary mechanism comes out, said planetary element holder group being able to include one or several arms one, or several, preferably three planetary cams (4) mounted on said planetary element holder (3) that gears in the pinion and in the outside cam (2);

the outside cam (2), that gears inside with the planetary cams (4), normally braked in their rotatin movement by one or several elements (5) of the torque limiting and regulating group (b) that are housed in some grooves or configurations placed for this purpose in said cam (2), controlling and thus limitng said rotation movement: in such a way that, upon exceeding a pre-set torque, said movable part (2) is released from the planetary gear mechansim, said part then being to turn and due to its configuration it causes in its rotation the cutoff of the driving energy and only one part of the movement is transmitted through the planetary element holder to the rest of the mechanism.

4. Servomechanism according to one of the claims 1 or 2, characterized in that the circumstantially movable part (2') is the planetary element holder of a planetary gear mechanism, said planetary element holder being allowed to have rotation movement upon its own shaft; said mechanism comprising, at least:

one frame (O);

one pinion (1) or cam fastened to said input shaft and that gears directly with the planetary cams (4);

one, or several, preferably three, planetary cams (4) mounted on said planetary element holder (2) that gears in the pinion (1) and in the outside cam (3);

a free or stationary cam (3) depending on whether or not one wants the movement and resulting torque of the planetary mechanism to come through it;

a planetary element holder (2') where the planetary cams (4) are mounted and that can only have rotation movement though limited and regulated by one, or several torque (b)limiting elements (5), that are housed in some configurations or grooves placed for this purpose in said planetary element holder (2').

5. Servomechanism according to claim 4, characterized in that the outside cam (3) gears outside with a transmission gear that, either transmits to said outside cam (3) movement and torque, or else keeps said outside cam (3) stationary and braked.

6. Servomechanism according to one of the claims 1 or 2, characterized in that it includes two planetary gear mechanisms, the first one of them being preferably conical and the second one being preferably straight and because the input shaft (1) of the preferably straight planetary element is, in turn, the outside cam (90) of a preferably conical planetary gear mechanism that comprises, at least:

one input shaft (71)

one preferably conical pinion (92) fastened to said input shaft (71) and that gears directly with the pinions or preferably conical planetary cams (91), a planetary element holder (93) where there are conical planetary cams (91) and through which, in the event that the preferably conical cam (90) is stationary, the movement and torque resulting from the planetary-mechanism (a-2) come out, one or several preferably conical planetary cams (90) mounted on the planetary element holder (93), that gear in the preferably conical input pinion (92)and with the preferably conical center cam (90), a preferably conical outside cam (90) that acts as an input shaft of the preferably straight gear planetary element, in such a way that as long as the outside cam (3) of the second preferably straight planetary element, is in a stationary position, there are the following two possibilities of movement:

1) When the torque transmitted by the preferably conical planetary element is below the preset limit as maximum torque, the movement and torque will come out through the planetary element holder (93) of said preferably conical gear; upon keeping the preferably straight planetary element stationary due to the fact that the element or elements (5) that prevent(s) movement thereof; and 2) when said torque is above the preset limit, the torque will come partly out through the planetary element holder of the preferably conical planetary element (93) (applied torque) and partly through the planetary element holder (2') (movement and excess torque)as the torque limiter has "jumped", thus releasing said planetary element holder (2').

7. Servomechanism according to one of the claims 1 or 2, characterized in that the movable part (2") only has longitudinal movement, never rotation movement and in that it comprises:

a frame (O);

an input shaft (71) threaded on its end with a reversible function thread (70);

a hollow shaft (72) threaded inside to house the input shaft (71);

an output shaft, inside said hollow shaft (72) and fastened to it by a sliding key or the like (72) and fastened to it by a sliding key or the like (75) placed in such a way that both shafts turn integrally, but allowing the longitudinal movement (or displacement) of the outpust shaft (74);

at least an elastic element (69), placed so that it returns, once the operation has ended, the movable part (2") to its initial position.

a movable part (2") that, mounted outside said hollow shaft (72) can only move longitudinally along said hollow shaft (72), said movable part (2") having a geometry such that its longitudinal movement is limited and controlled by the element (5) of the torque limiting group (b) and limits, at the same time, the longitudinal movement of said hollow shaft (72), in such a way that upon exceeding the torque present in the elastic element (6) said movable part (2") can move longitidunally cutting off the input energy supply and absorbing or taking advantage of the excess energies by the profile (59) of the movable part (2").

8. Servomechanism according to one of the claims 1 or 2, characterized in that the movable part (2") can only have longitudinal movement, never rotation movement, and that comprises:

a frame (O);

an electric, pneumatic or hydraulic motor that actuates as an input mechanism (100);

an output shaft (73) with reversible function thread;

a hollow shaft, threaded inside to house the output shaft and integral outside to the motor;

an output bushing included in one end of the hollow shaft between the the latter and the output shaft, joined to said output shaft by means of a sliding key or similar element that makes them turn together, but allowing longitudinal movement of the output shaft;

a movable part (2") that, mounted outside to said output shaft (73) is placed so that it can only move longitudinally along said output shaft, said movable part (2") having a shape such that the longitudinal movement is limited and controlled by the element (5) of the torque limiting group (b) and limits, at the same time, the longitudinal movement of said output shaft (73), so that upon exceeding the torque present in the elastic element (6) said movable part (2") can move longitudinally cutting off the supply of input energy and absorbing to taking advantage of the excess power by the profile of the movable part (2");

at least one, elastic element (69), placed so that it returns, once the operation of said motor (100) has finished, said movable part (2") to its initial position, said elastic element being large enough to allow the friction to be ovecome and to return the mechansim to its initial position, but small enough so as not to prevent or impede the operation of the mechanism.

9. Servomechanism according to claim 8, characterized in that it has a locking adjustment device that comprises:

an elastic element (61);

a groove placed in the outside of the shaft right inside the movable part (2"), the elastic element being placed in such a way that a contact element is kept constlantly in contact with element (5) and another contact element keeping constantly in contact with said groove in said shaft, in such a way that it is managed that during starts the force that the element (5) exerts on the movable part (2") is greater and, therefore the adjusted maximum torque is greater too.

10. Servomechanism according to one of the claims 1 or 2, characterized in that the movable part (2''') can have longitudinal as well as rotation movement with regard to its own shaft, and that comprises:

a frame (O);

a hollow (or solid) input shaft or mechanism (71);

an output shaft (73) that consists of a threaded part (70);

a hollow outside part fixed in its movement to the input shaft or mechanism (88);

a hollow intermediate part (89), integral in its movement to said hollow outside part but it can move longtidinally with regard thereto, thanks to a sliding key or similar element that connects them;

a hollow element (98) threaded inside, integral in its rotation movement to said hollow intermediate part (89) and whose inside thread is coupled to said thread of said output shaft;

a movable part (2''') that turns integral to said hollow outside part (88) but being able to move longitudinally to the same, thanks to a sliding key or similar element that connected them;

said movable part (2''') being mounted outside said output shaft and outside said hollow intermediate part (89), it being able to move longitudinally with regard to the latter, said movable part (2''') having a geometry or configuration such that said longitudinal movement is limited and controlled by the mechanical contact element (5) of the torque limiting group (b), though without limiting the longitudinal movement of said hollow intermediate part (89);

at least, one elastic element (69), placed so that it returns, once the operation of the input shaft or element (71) has ended, said movable part (2''') to its initial position, and that has a torque limiting group (b) placed in such a way that it effects circular movement around its own main shaft, integral to the outside hollow part and that includes:

one (or several) mechanical contact element(s) (5);

at least one primary elastic element (6);

an adjustment and regulation element (7) of said elastic element;

the elastic elements (6) being regulated by the adjustment element (7) so that they regulate the force that, depending on the speed of rotation of the input shaft or element (71) or on the centrifugal force generated by the mechanical contact element (5), exerts on said movable part (2'''), taking advantage of the centrifugal force as a self-adjustment element.

11. Servomechanism according to the claims 1 or 2, characterized in that it includes a device that defines a biunivocal correspondence between the excess energy and the angular or longitudinal displacement of the circumstantially movable part (2, 2', 2", 2''') upon being released in such a way that, upon the applied power being pre-set, one can observe or measure the variation of the passive power by variation of the angular or longitudinal displacement of the circumstantially movable part (2, 2', 2", 2''').

12. Servomechanism, according to claims 1 or 2, characterized in that it comprises means to effect a general check of the mechansim and of the equipment actuated by it, upon including any sensor device that gives a signal or measures continuously or discretely this angular or longitudinal movement, which, when it is smaller than the established one it involves the increase of passive forces and thus malfunctioning of the mechanism and of the actuated equipment, and on the contrary, the increase of angular or longitudinal displacement of the circumstantially movable part (2, 2', 2", 2''') determines that there has been a drop in the passive forces, this signal being able to be picked up and taken advantage of in certain cases such as when the actuated element has packing in order to order retightening of the same by means of an electroclutch or auxiliary actuator mechansim said means being placed in order to carry out said general check in the closing directionas well as in the opening direction, or on both.

13. Servomechanism, according to claims 1 or 2, characterized in that the circumstantially movable part (2, 2', 2", 2''') has its outside periphery not concentric with the inside toothed one and the elastic element (6) is placed in such a way that it actuates on a notch made in the point radially closest to said periphery.

14. Servomechanism according to claims 1 or 2, characterized in that it includes a device that allows circumstantial locking of the circumstantially movable part (2, 2', 2", 2'''), either by immobilization of the torque limiting group (b) or by insertion of a rigid element in a housing of said part.

15. Servomechanism, according to claims 1 or 2, characterized in that it includes one or several auxiliary dampening devices ($\chi$) applied to the circumstantially movable part (2, 2', 2", 2''') to absorb in the sensitive movement of said part more excess power than the maximum that can be absorbed by the torque limiter (b); the different elements being placed in such a way that said absorption depends on the outside geometric configuration of said circumstantially movable part (2, 2', 2", 2''') and on the adjustment of said auxiliary dampening device ($\chi$).

16. Servomechanism, according to claims 1 or 2, characterized in that it allows the increase of the kinetic energy, in sporadic cases, by means of including an inertia flywheel.

17. Servomechanism, according to claims 1 or 2, characterized in that it includes an automatic centrifugal engaging group (d) connected to a motor, placed so that it carries out the connection upon attaining the rated revolutions.

18. Servomechanism, according to claim 17, characerized in that there is a flywheel (26) that can be actuated manually by applying manual power to the output, connected to the centrifugal clutch (d), the motor remaining disengaged upon exceeding a predetermined speed.

19. Servomechanism, according to claim 18, characterized in that the centrifugal clutch (d) has a structure that permits upon reducing the revolutions and disengaging the motor, without stopping, the same can pick up revolutions off circuit, re-engaging to be able to accumulate successive pressure surges until the motor stops due to heating, sufficing for this the insertion of an irreversible element in the output of the actuator or transfer mechanism.

20. Servomechanism, according to claims 1 or 2, characterized in having an irreversible high efficiency element that transmit the torque of the input shaft to the output shaft of said mechanism, and during said torque transmission it blocks any movement of the output shaft in the direction of rotation contrary to that of the torque transmission, and once the transmission of said torque has stopped, it blocks any movement of the output shaft in any of the two directions of rotation.

21. Servomechanism according to claims 1 or 2, characterized in that it has a locking adjustment device of the element(s) (5) that comprises:
 a centrifugal mechanism (19, 20, 23, 24, 25);
 at least one intermediate elastic element (61);
 optional contact elements resting on the elastic element (60), the elements being placed in such a way that the outside surface of the centrifugal mechanism (23) is kept pressed against the contact elements and these in turn against the adjustment device (b), in such a way that, depending on the outside geometry and elasticity of the centrifugal mechanism (23) and on the speed of rotation, the force needed to release the circumstantially movable part (2, 2', 2", 2''') will be more or less.

22. Servomechanism according to claims 1 or 2, characterized in that it has one or several current cutoff elements (c) each one of which comprises:
 one or several electric microswitches or any other direct or indirect electric current interruption element (9)
 one (or several) elastic element(s)
 a slidable element (10) contacting with the circumstantially movable part (2, 2', 2", 2''');
said element having one or several grooves where both contact elements are included so that, upon said slidable element moving, the corresponding microswitches are activated, said outside surface being oL said movable part (2, 2', 2", 2'''), provided with a geometric configuration so that for specific angles of rotation or angular movement, said slidable elements move in one direction or the other.

23. Servomechanism, according to claims 1 or 2, characterized in that it includes a group with a bushing (f) that allows for checking of the output torque and capturing a signal by means of two concentric bushing with reversible thread, acting as a helicoidal cotterway and the inside of them resting on one or more elastic elements that permit them to move, being able to take advantage of this movement to generate a signal that indicates that variation of the passive forces, an increase thereof corresponding to a smaller run, indicating an anomaly in the transfer mechanism or in the actuator equipment, while a larger run corresponds to a reduction of the passive force, being able to take advantage of this signal, in the equipment actuated by the mechanism that has packing, to order a retightening of the packing by means of an electroclutch or auxiliary actuator.

24. Servomechanism, according to claims 1 or 2, characterized in that it includes a floating nut group (g) that allows checking of the thrust of the pressure exerted longitudinally by the spindle on the nut that commands it the nut being floating, in one or both ends, upon one or two elastic elements that allow it to mobe, this movement being able to be taken advantage of to generate a signal that indicates the variation of the passive forces, an increase thereof corresponding to a smaller run, which indicates an anomaly in the power transfer mechanism or in the equipment actuated by it, while a greater run corresponds to a reduction of the passive forces; this signal being able to be taken advantage of, in the equipment actuated that has packing, in order to order a retightening of the packing by means of an electroclutch or auxiliary actuator.

25. Servomechanism according to claims 1 or 2, characterized in that it includes a multiplier grpup (h) that with the same output torque and revolutions of the actuator or reducer, one can convert circular movement of the main nut into linear movement, by means of a doubly threaded sleeve, the male in the main nut and the female in the end of the spindle, which cannot turn but can move, in such a way that the threads can alternately function as such, or else, as helicoidal cotterways depending on a rigid or flexible linking element (46), as well as on some stops, there being greater speed and less force in the linear displacement of the spindle when the smaller thread acts as a helicoidal cotterway and the larger one acts as thread and lessd sped and more force when both function reciprocally, with the additional particularity that upon reversing the rotation of the main nut (41) the spindle is withdrawn through the smaller thread and upon this thread stopping the spindle increases it speed of movement through the larger diameter thread, until it reaches it pre-set position, remaining ready to repeat the cycle completely or partially.

26. Servomechanism according to claim 25, characterized in that the threads that comprise said mechanism are ball threads, and therefore reversible, with low friction and high efficiency.

27. Servomechanism according to claims 1 or 2, characterized in that it includes an endless-crown reduction mechanism with some conditions such that said endless-crown reduction mechanism replaces the threaded part (70) of the inside shaft (72) or (71), providing the possibility of longitudinal reversible movement that the thread (70) of the inside shaft (72) or (83) provided and that was controlled by the torque limiting and regulating unit.

28. Servomechanism according to claims 1 or 2, characterized in including in its output any known reduction or multiplication element that allows one to achieve different speeds and stresses or torques.

* * * * *